United States Patent
Lee et al.

(10) Patent No.: US 11,658,743 B2
(45) Date of Patent: May 23, 2023

(54) METHOD FOR TRANSMITTING AND RECEIVING SIGNAL IN OPTICAL WIRELESS COMMUNICATION SYSTEM, AND TRANSMITTING TERMINAL AND RECEIVING TERMINAL THEREFOR

(71) Applicant: LG ELECTRONICS INC., Seoul (KR)

(72) Inventors: Hojae Lee, Seoul (KR); Sangrim Lee, Seoul (KR); Byounghoon Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/597,113

(22) PCT Filed: Jun. 28, 2019

(86) PCT No.: PCT/KR2019/007893
§ 371 (c)(1),
(2) Date: Dec. 27, 2021

(87) PCT Pub. No.: WO2020/262744
PCT Pub. Date: Dec. 30, 2020

(65) Prior Publication Data
US 2022/0360330 A1    Nov. 10, 2022

(51) Int. Cl.
*H04B 10/00* (2013.01)
*H04B 10/112* (2013.01)
*H04B 10/2507* (2013.01)

(52) U.S. Cl.
CPC ..... *H04B 10/1123* (2013.01); *H04B 10/2507* (2013.01)

(58) Field of Classification Search
CPC .............. H04B 10/112; H04B 10/1123; H04B 10/114; H04B 10/1143; H04B 10/1149;
(Continued)

(56) References Cited

U.S. PATENT DOCUMENTS 9,077,577 B1   7/2015  Ashrafi et al.
9,712,273 B2 * 7/2017  Yu ..................... H04B 10/5161
(Continued)

FOREIGN PATENT DOCUMENTS

| KR | 101857856  | 5/2018 |
| WO | 2010008692 | 1/2010 |
| WO | 2019-126412 | 6/2019 |

OTHER PUBLICATIONS

PCT International Application No. PCT/KR2019/007893, International Search Report dated Mar. 27, 2020, 4 pages.
(Continued)

*Primary Examiner* — Hanh Phan
(74) *Attorney, Agent, or Firm* — Lee Hong Degerman Kang Waimey

(57) ABSTRACT

A method of receiving, by a receiving terminal, a signal in optical wireless communication is proposed. The method may comprise: establishing a communication link for performing the optical wireless communication with a transmitting terminal; receiving an optical signal from the transmitting terminal through the communication link; and performing interference cancelation on the optical signal. Here, establishing the communication link comprises transmitting and receiving initial information with the transmitting terminal, wherein the initial information may include an orbital angular momentum (OAM) mode applied to the optical signal. In addition, the interference cancelation may be performed on the basis of the OAM mode.

12 Claims, 24 Drawing Sheets

(58) Field of Classification Search
CPC ............... H04B 10/40; H04B 10/2507; H04B 10/07953; H04J 14/04
USPC ....... 398/118, 119, 127, 128, 129, 130, 131, 398/172, 135, 136, 137, 138, 139, 158, 398/159, 43, 44
See application file for complete search history.

(56) References Cited

U.S. PATENT DOCUMENTS

| | | | |
|---|---|---|---|
| 2015/0188660 A1* | 7/2015 | Byun | H04B 10/70 398/44 |
| 2017/0170574 A1* | 6/2017 | Sacco | H01Q 21/205 |
| 2021/0021053 A1* | 1/2021 | Sasaki | H04L 27/366 |

OTHER PUBLICATIONS

European Patent Office Application Serial No. 19935057.0, Search Report dated May 23, 2022, 10 pages.

Amhoud et al., "OAM Mode Selection and Space-Time Coding for Turbulence Mitigation in FSO Communications," arXiv; 1810.06811v1, Oct. 2018, 6 pages.

Saito et a., "Performance Enhancement of OAM-MIMO Using Successive Interference Cancellation," 2019 IEEE 89th Vehicular Technology Conference (VTC2019-SPRING), IEEE, Apr. 2019, 5 pages.

* cited by examiner

Photodiode Array

Photodiode Array

Photodiode Array

METHOD FOR TRANSMITTING AND RECEIVING SIGNAL IN OPTICAL WIRELESS COMMUNICATION SYSTEM, AND TRANSMITTING TERMINAL AND RECEIVING TERMINAL THEREFOR

CROSS-REFERENCE TO RELATED APPLICATIONS

This application is the National Stage filing under 35 U.S.C. 371 of International Application No. PCT/KR2019/007893, filed on Jun. 28 2019, the contents of which are all incorporated by reference herein in its entirety.

TECHNICAL FIELD

The present disclosure relates to a method of transmitting and receiving a signal in an optical wireless communication system and transmitting and receiving user equipments (UEs) therefor, and more particularly, to a method of transmitting and receiving a signal based on the characteristics of orbital angular momentum (OAM).

BACKGROUND ART

Optical wireless communication systems may be largely divided into visible light communication (VLC) systems and free-space optical (FSO) communication systems according to the frequency and purpose of photons.

VLC plays the role of lighting and communication at the same time. Information is transmitted by visible light, which may depend on the intensity of the light or the blinking of the light. To this end, visible light devices such as a light emitting diode (LED) is commonly used.

FSO communication mainly plays the role of communication and is usually used in a free space environment or an environment where signal straightness is guaranteed. The FSO communication also covers ultraviolet (UV) and infrared (IR) light as well as visible light. Unlike VLC, FSO communication is not involved in lighting, so there are no restrictions on lighting. In general, not only LEDs but also devices based on the straightness of light such as light amplification by stimulated emission of radiation (LASER) are used.

In conventional data transmission and reception based on optical wireless communication, it may be difficult to guarantee the decoding performance of a receiver due to the influence of an external interference light source. In particular, interference from strong sunlight may significantly reduce the decoding performance of the receiver. Therefore, there is a need for a signal transmission and reception method for optical wireless communication that is robust to external interference.

DISCLOSURE

Technical Problem

The object of the present disclosure is to provide a method of transmitting and receiving a signal in an optical wireless communication system capable of guaranteeing the decoding performance of a receiving user equipment (UE) regardless of the influence of an external interference light source in order to solve the above problems.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of transmitting and receiving a signal in an optical wireless communication system is provided. The method may include: establishing a communication link with a transmitting UE to perform wireless optical communication; receiving optical signals from the transmitting UE through the communication link; and performing interference cancellation on the optical signals. Establishing the communication link may include exchanging initial information with the transmitting UE, and the initial information may include an orbital angular momentum (OAM) mode applied to the optical signals. The interference cancellation may be performed based on the OAM mode.

Performing the interference cancellation may include selectively applying optical-to-electrical (O-to-E) conversion to the optical signals after passing the optical signals through an optical filter and detecting the optical signals with an optical-electrical converter.

The optical-electrical converter may include a plurality of optical-electrical conversion elements, and the O-to-E conversion may be applied to only an optical signal detected by an optical-electrical conversion element in which intensities of the optical signals satisfy a predetermined threshold among the plurality of optical-electrical conversion elements.

A distance between the optical filter and the optical-electric converter may be configured to be a focal plane of the OAM mode applied to the optical signals based on the initial information. The O-to-E conversion may be applied to only an optical signal detected by an optical-electrical conversion element having distributed therein intensities of the optical signals to which the OAM mode is applied among the plurality of optical-electrical conversion elements included in the optical-electrical converter.

The optical filter comprises at least one of a lens, a Fresnel zone plate, a photon sieve, or a phase mask.

The O-to-E conversion may not be applied to an optical signal detected by an optical-electrical conversion element in an area in which, among the optical signals detected by the optical-electrical converter, a desired signal and an interference signal overlap.

Performing the interference cancellation may further include: receiving a reference signal from the transmitting UE; and performing channel estimation based on the reference signal in an area on the optical-electrical converter in which a desired signal is detected.

Advantageous Effects

A method of transmitting and receiving a signal in an optical wireless communication system according to an aspect of the present disclosure may remove or mitigate interference from an interference optical source including sunlight.

Specifically, the method of transmitting and receiving the signal in the optical wireless communication system according to the aspect of the present disclosure uses the characteristics of orbital angular momentum (OAM) expected to be possessed by electromagnetic waves. According to these characteristics, transmitting and receiving user equipments (UEs) may determine a specific OAM mode during initial access, thereby clearly identifying a desired beam and an interference beam. Accordingly, the receiving UE may efficiently remove or mitigate interference from an interference optical source including sunlight.

The above-described aspects of the present disclosure are merely some of the preferred embodiments of the present disclosure, and various embodiments reflecting the technical features of the present disclosure may be derived and understood by those skilled in the art based on the following detailed description of the disclosure.

DESCRIPTION OF DRAWINGS

The accompanying drawings, which are included to provide a further understanding of the present disclosure and are incorporated in and constitute a part of this specification, illustrate embodiments of the disclosure and together with the description serve to explain the principles of the disclosure.

BEST MODE

Figure 1:
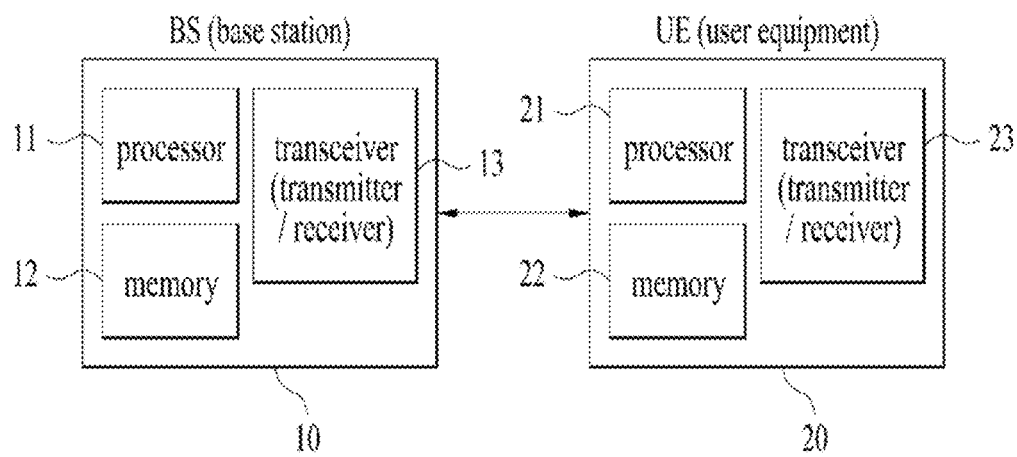
FIG. 1 is a diagram illustrating an exemplary system for implementing the present disclosure.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A and 5G systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a diagram illustrating a system for implementing the present disclosure.

Referring to FIG. 1, a wireless communication system includes a BS 10 and one or more UEs 20. On downlink (DL), a transmitter may be a part of the BS 10 and a receiver may be a part of the UE 20. On uplink (UL), the BS 10 may include a processor 11, a memory 12, and a radio frequency (RF) unit 13 (transmitter and receiver). The processor 11 may be configured to implement the proposed procedures and/or methods disclosed in the present application. The memory 12 is coupled to the processor 11 to store a variety of information for operating the processor 11. The RF unit 13 is coupled to the processor 11 to transmit and/or receive radio signals. The UE 20 may include a processor 21, a memory 22, and an RF unit 23 (transmitter and receiver). The processor 21 may be configured to implement the proposed procedures and/or methods disclosed in the present application. The memory 22 is coupled to the processor 21 to store a variety of information for operating the processor 21. The RF unit 23 is coupled to the processor 21 to transmit and/or receive radio signals. The BS 10 and/or the UE 20 may include a single antenna and multiple antennas. If at least one of the BS 10 or the UE 20 includes multiple antennas, the wireless communication system may be called a multiple input multiple output (MIMO) system.

In the present specification, although the processor 21 of the UE and the processor 11 of the BS perform an operation of processing signals and data, except for a function of receiving or transmitting signals and a function of storing signals, the processors 11 and 21 will not be especially mentioned for convenience of description. Even though the processors 11 and 21 are not particularly mentioned, it may be said that the processors 11 and 21 perform operations of processing data except for a function of receiving or transmitting signals.

The present disclosure proposes various new frame structure for a 5$^{th}$ generation (5G) communication system. In the next generation 5G system, communication scenarios are classified into Enhanced Mobile Broadband (eMBB), Ultra-reliability and low-latency communication (URLLC), Massive Machine-Type Communications (mMTC), etc. Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

Figure 2:
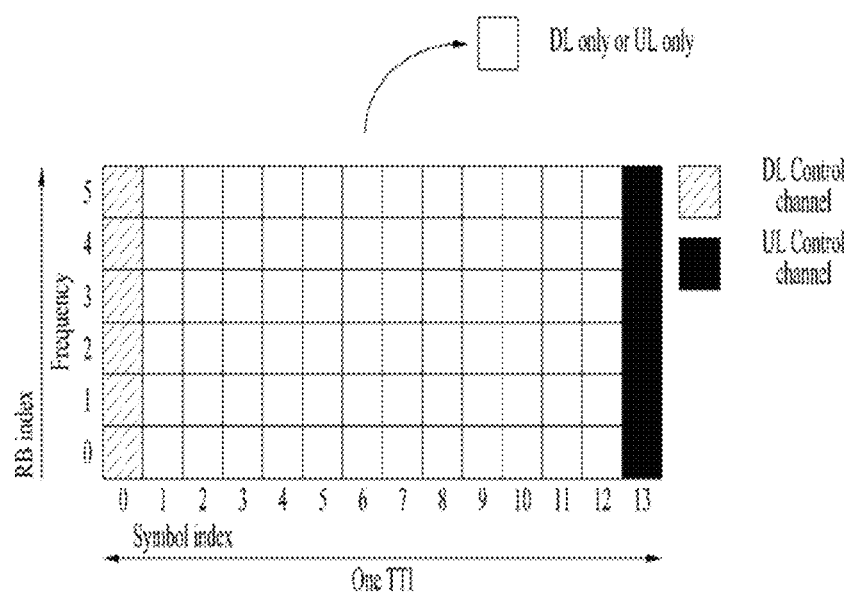
FIG. 2 is a diagram illustrating an exemplary subframe structure in which a data channel and a control channel are multiplexed in time division multiplexing (TDM)

FIG. 2 is a diagram illustrating an exemplary subframe structure in which a data channel and a control channel are multiplexed in time division multiplexing (TDM). In 5G NR, a frame structure in which a control channel and a data channel are multiplexed according to TDM like FIG. 2 may be considered in order to minimize latency.

In FIG. 2, the hatched area represents a transmission region of a DL control channel carrying DCI (e.g., PDCCH), and the last symbol represents a transmission region of a UL control channel carrying UCI (e.g., PUCCH). Here, the DCI is control information transmitted from a gNB to a UE and may include information on a cell configuration the UE should know, DL-specific information such as DL scheduling, UL-specific information such as a UL grant, etc. The UCI is control information transmitted from the UE to the gNB and may include a HARQ ACK/NACK report on DL data, a CSI report on a DL channel state, a scheduling request (SR), etc.

In FIG. 2, blank areas are available for flexible configuration of DL or UL periods to achieve DL/UL flexibility. For example, a blank area may be used as a data channel for DL data transmission (e.g., a physical downlink shared channel (PDSCH)) or a data channel for UL data transmission (e.g., a physical uplink shared channel (PUSCH)). This structure is characterized in that since a DL transmission and a UL transmission may be performed sequentially in one subframe, an eNB may transmit DL data in the subframe to a UE and receive an HARQ ACK/NACK signal for the DL data in the subframe from the UE. That is, the time required to retransmit data when a data transmission error occurs may be reduced, thereby minimizing the latency of final data transmission.

In the self-contained subframe structure, a time gap is necessary in order that the gNB and UE switch to a reception mode from a transmission mode, and vice versa. For the switching between the transmission mode and the reception mode, some OFDM symbols at the time of DL-to-UL switching may be configured as a guard period (GP) in the self-contained subframe structure.

Visible Light Communication (VLC)

Figure 3:
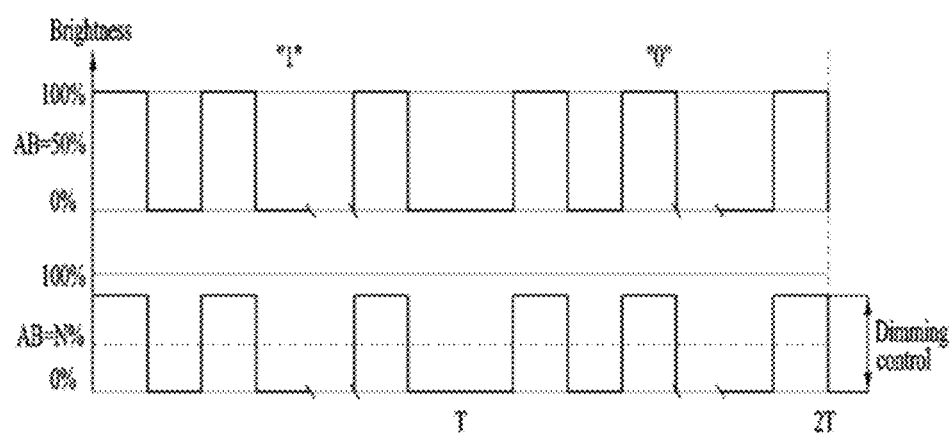
FIGS. 3 to 4 are diagrams illustrating single carrier modulation (SCM) for visible light communication.
Figure 4:
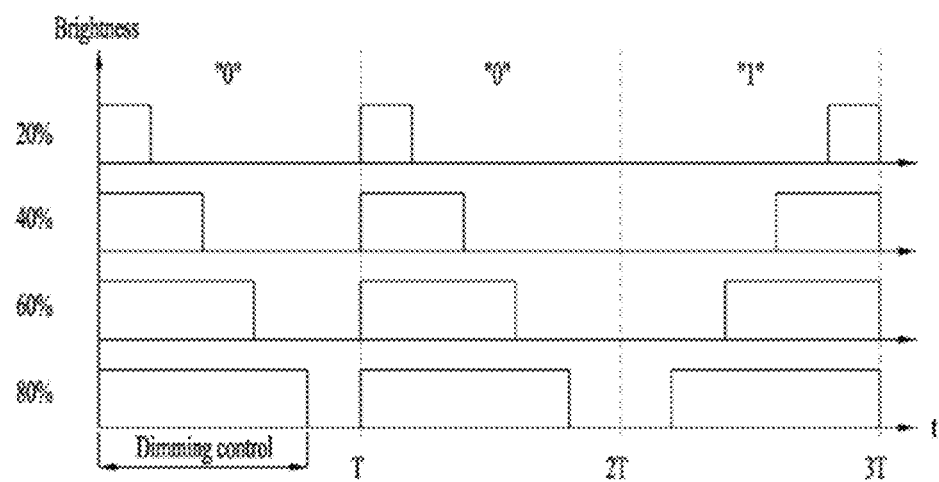

Generally, for a visible light systems, single carrier modulation (SCM) schemes based on on-off keying (OOK) for presenting signals based on flickering of visible light are provided. Referring to FIGS. 3 and 4, OOK modulation is a scheme of presenting digital signals 1 and 0 according to the ON and OFF of the light source. OOK modulation may be modified to methods such as pulse position modulation (PPM), which performs modulation into a pulse position based on a clock.

Regarding the visible light communication system, research on multi-carrier modulation (MCM) schemes have been conducted. Compared to the single carrier modulation scheme, the MCM scheme is robust to multipath, and enables operation of a single tap equalizer. It is also robust to DC wandering and flickering interference. The MCM-based waveform for VLC must satisfy the conditions that i) it has only one dimension (real-value) signal and ii) it has unipolar characteristics.

Figure 5:
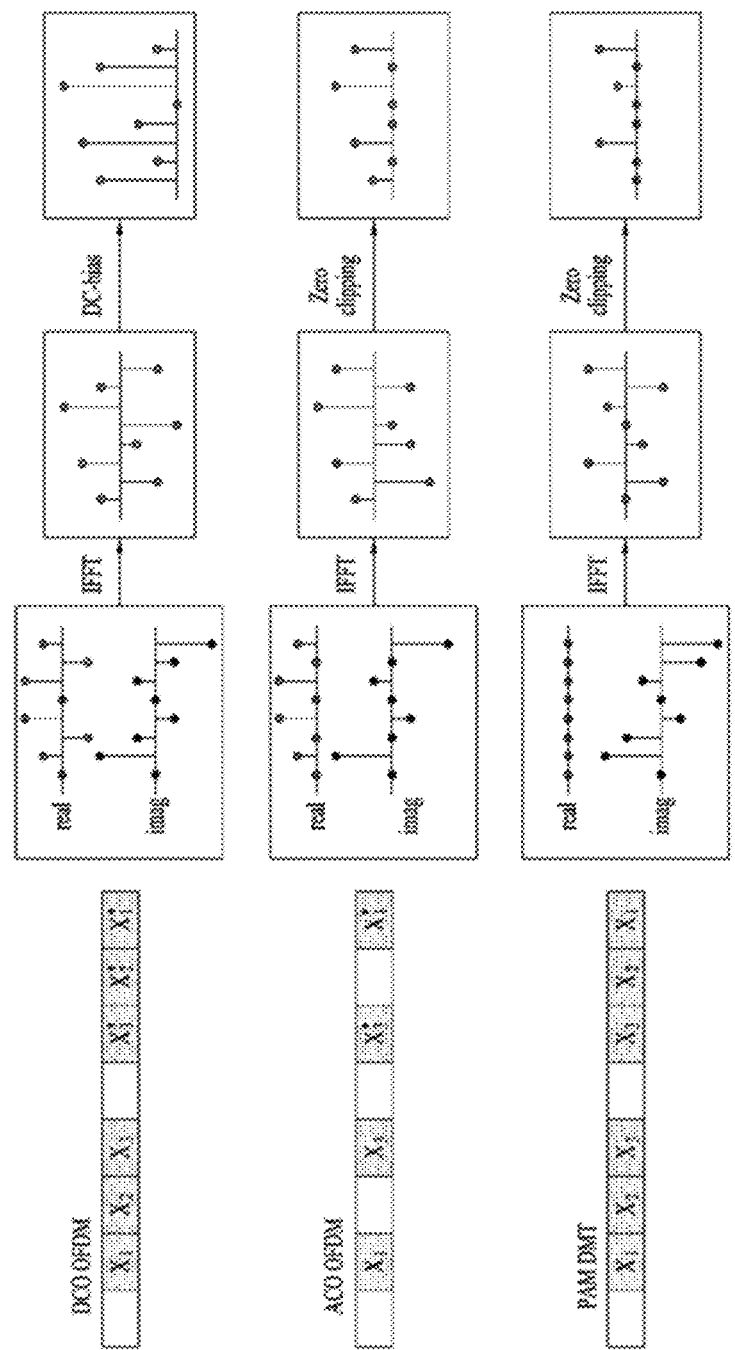
FIG. 5 is a diagram illustrating multi-carrier modulation (MCM) for visible light communication.

Various MCM schemes satisfying the above conditions have been introduced. These MCM schemes may be classified into DC-biased optical OFDM (DCO-OFDM), asymmetrically clipped optical OFDM (ACO-OFDM), and pulse-amplitude modulated discrete multi-tone modulation (PAM-DMT). These schemes will be described with reference to FIG. 5.

i) DCO-OFDM: This corresponds to the first subcarrier mapping of FIG. 5, in which modulated symbols are Hermitian symmetrically arranged. The Hermitian symmetric arrangement means arranging symbols in the form of conjugate so as to be symmetry with respect to the DC subcarrier as a boundary. In this arrangement method, a waveform in the time domain is transformed into a real value signal. Thereafter, a final unipolar time domain signal is created by biasing the transformed signal as much as the minimum value (i.e., negative value with maximum amplitude) in the time domain stage.

ii) ACO-OFDM: This corresponds to the second subcarrier mapping of FIG. 5. Half of the modulated symbols in DCO-OFDM are arranged Hermitian symmetrically at constant intervals. In this subcarrier mapping, a waveform in the time domain takes the form of a real value signal and is repeated with an inverted sign. Then, a final unipolar time domain signal is created by zero clipping the waveform that appears repeatedly as described above.

iii) PAM-DMT: This corresponds to the third subcarrier mapping of FIG. 5. In this scheme, a real value signal is placed in the imaginary part by flipping the same with respect to the center in the PAM fashion. In this subcarrier mapping, the waveform in the time domain takes the form of a real value signal and repeatedly appears in a symmetric form with an inverted sign. Similar to ACO-OFDM, a final unipolar time domain signal is created by performing zero clipping.

Table 1 describes the performance measure of each of the aforementioned schemes DCO-OFDM, ACO-OFDM and PAM-DMT. The performance measure may be, for example, spectral efficiency (SE), PAPR, signal-to-noise ratio (SNR), or bit error rate (BER).

TABLE 1

|  | SE | SNR | BER |
|---|---|---|---|
| DCO OFDM | ○ | X | X |
| ACO OFDM | X | ○ | ○ |
| PAM DMT OFDM | X | ○ | Δ |

Referring to Table 1, DCO-OFDM has half the SE for the Hermitian symmetry, but this may be seen as the most optimal SE in unipolar OFDM. However, in DCO OFDM, the SNR characteristic is deteriorated because a portion of the transmit power actually carried on the signal is small due to the bias (wherein the DC-bias value is a constant, and does not affect the performance of modulated symbol detection at the receiving side).

Referring to Table 1, ACO-OFDM has a disadvantage of having half SE of DCO OFDM. However, since DC bias is not required and the entire transmit power is carried on the desired signal, this scheme has a relatively good SNR characteristic.

Referring to Table 1, the PAM DMT has almost the same characteristics as the ACO OFDM. However, it is based on amplitude in one dimension, rather than using a quadrature complex symbol for modulation. Accordingly, the distance between symbols is reduced, and thus BER performance is lower than that in ACO OFDM.

Figure 6:
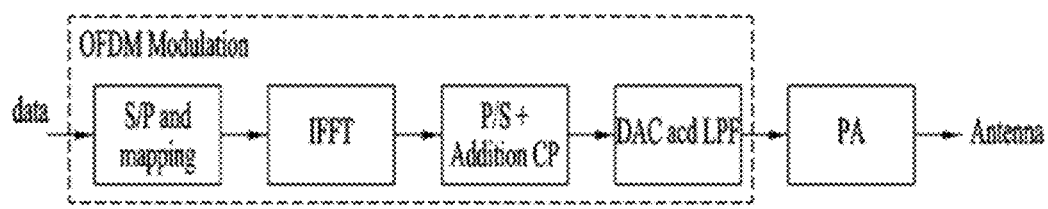
FIG. 6 is a diagram illustrating the OFDM modulation structure at the transmitting side of the conventional RF communication system.

FIG. 6 is a diagram illustrating the OFDM modulation structure at the transmitting side of the conventional RF communication system. Referring to FIG. 6, an analog signal obtained through OFDM modulation is amplified through an RF power amplifier (PA). In this case, the maximum amplified magnitude of the signal may be limited by the performance limit of the PA.

Figure 7:
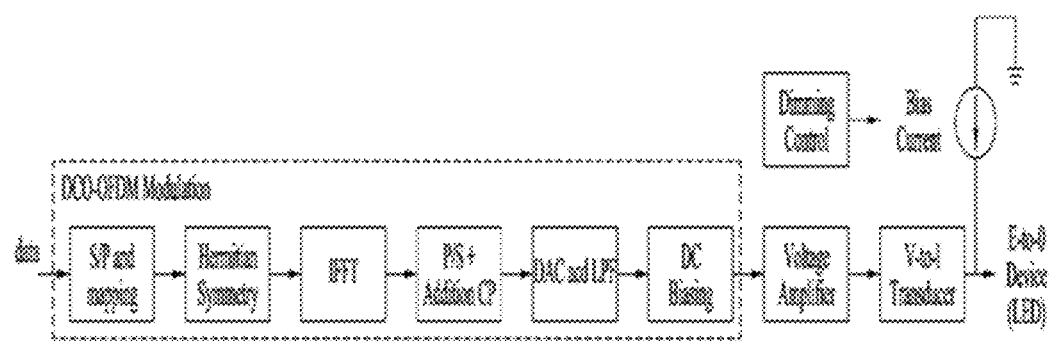
FIGS. 7 to 8 are diagrams illustrating the structure of a multi-carrier modulation transmitter of a visible light communication system.
Figure 8:
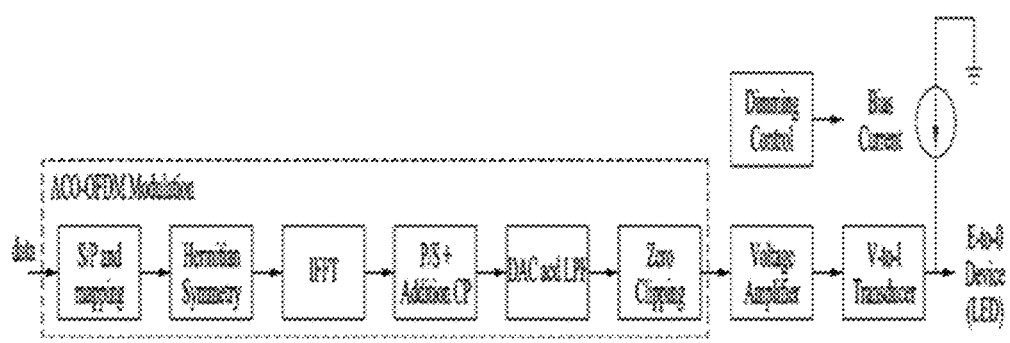

On the other hand, the structure of a multi-carrier modulation transmitter of the visible light communication system as shown in FIGS. 7 to 8. More specifically, FIG. 7 shows the structure of a DCO-OFDM modulation transmitter of the VLC communication system, and FIG. 8 shows the structure of an ACO-OFDM modulation transmitter of the VLC communication system.

Referring to FIGS. 7 to 8, a voltage amplifier, a voltage-to-current (V-to-I) transducer, and an electrical-to-optical (E-to-O) device (e.g., LED) all have non-linear characteristics. Therefore, an analog signal obtained through modulation is amplified and transformed. In FIGS. 7 to 8, dimming control through DC biasing is exemplified. In the case of the operation based on reverse polarity, dimming control may be performed through signal reconstruction.

Color-Shift Keying (CSK) Modulation

Figure 9:
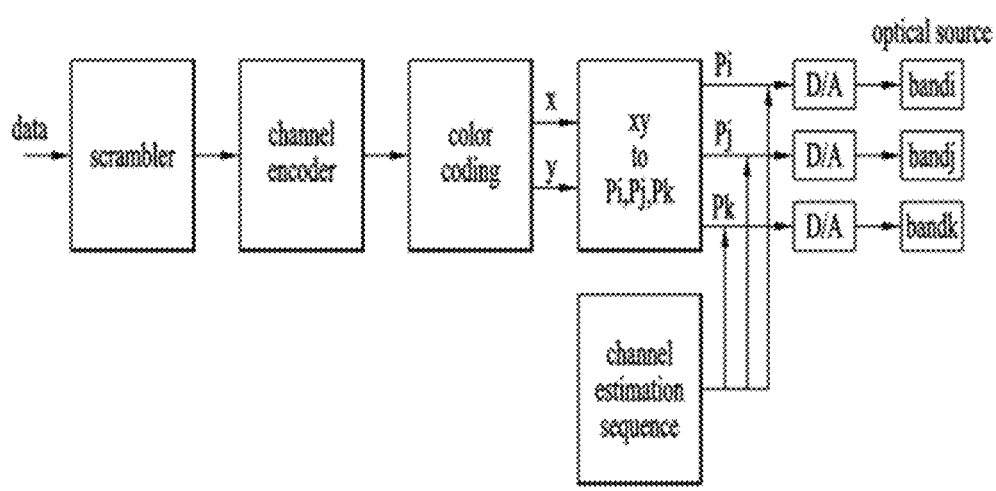
FIG. 9 is a diagram illustrating color-shift keying (CSK) modulation.

The aforementioned SCM and MCM may be operated based on color-shift keying (CSK) modulation. CSK modulation is a method for expressing a digital signal by combining colors based on the color characteristics of a light source. For example, when a digital signal is generated as illustrated in FIG. 9, the digital signal is transformed into a (x, y) color space signal through color coding. The transformed (x, y) color space signal is transmitted by a light source having a color. The color space may be defined as shown in FIG. 10, and the chromaticity distribution table may conform to the CIE 1931 color space (IEEE 802.15.7).

Figure 10:
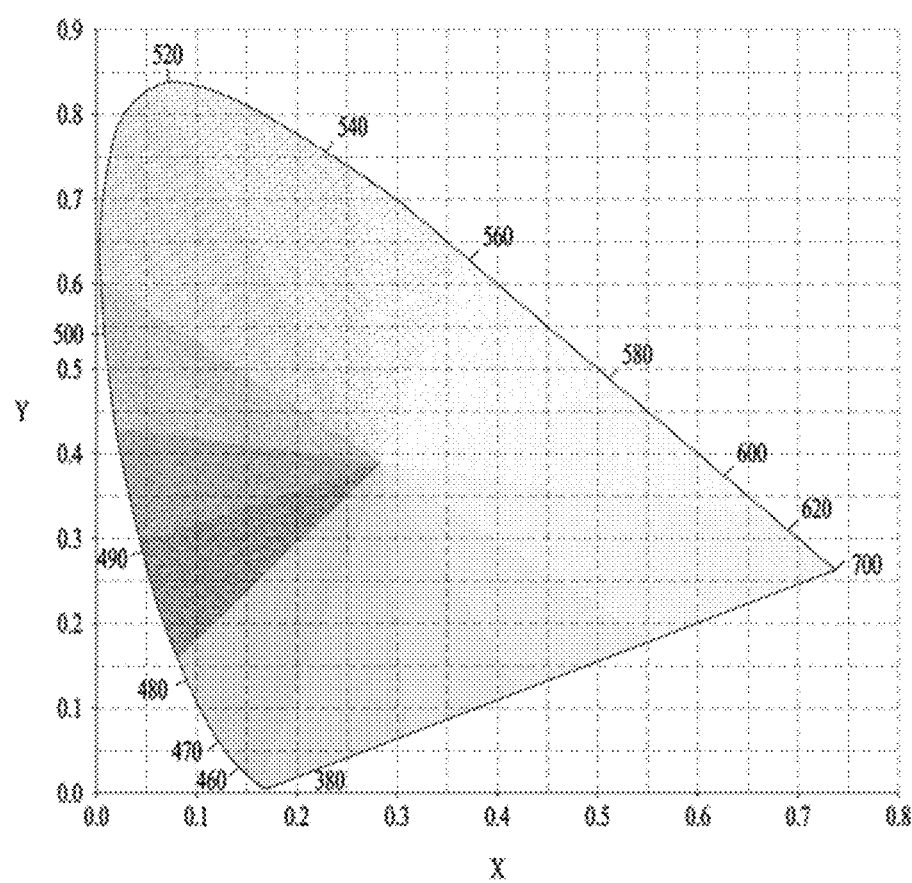
FIGS. 10 to 11 are diagrams illustrating an entire color space according to wavelength and a specific color space that may be expressed according to device characteristics.
Figure 11:
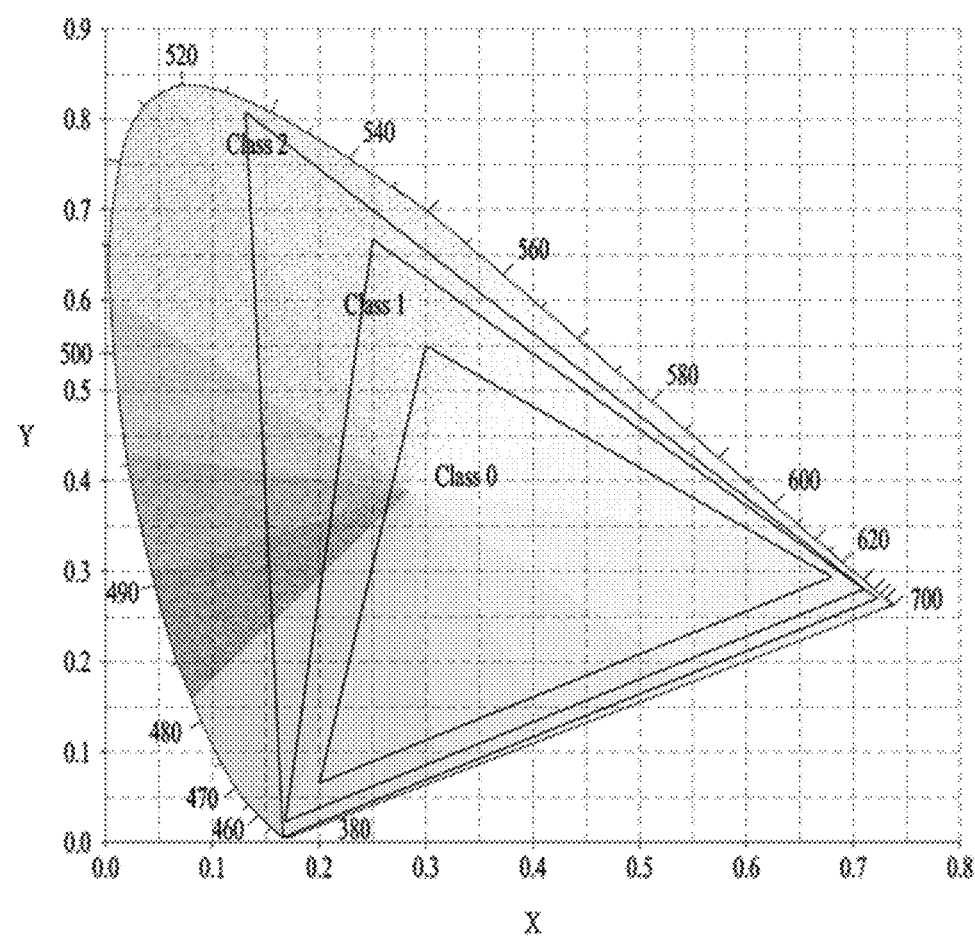

Referring to FIG. 10, the outer curved boundary line corresponds to monochromatic light, and the wavelength of each monochromatic light is indicated in nanometers. The colors shown in FIG. 10 may slightly differ among the color spaces of the color display devices. No conventionally known device may accurately present all the colors shown in FIG. 10. That is, as shown in FIG. 11, the range of colors that may be expressed may differ among the classes of equipment.

When one color is not represented by monochromatic light, it may be generated by mixing a plurality of color light sources (e.g., LEDs). The color point (x, y) is transformed by RGB. Referring to Equation 1, R, G, and B values are transformed into X, Y, and Z values to correspond to (x, y) values in the color space.

$$X = 2.7689R + 1.7517G + 1.1302B \qquad \text{[Equation 1]}$$
$$Y = R + 4.5907G + 0.0601B$$
$$Z = 0.0565G + 5.5943B$$
$$x = \frac{X}{X+Y+Z}, y = \frac{Y}{X+Y+Z}$$

Figure 12:
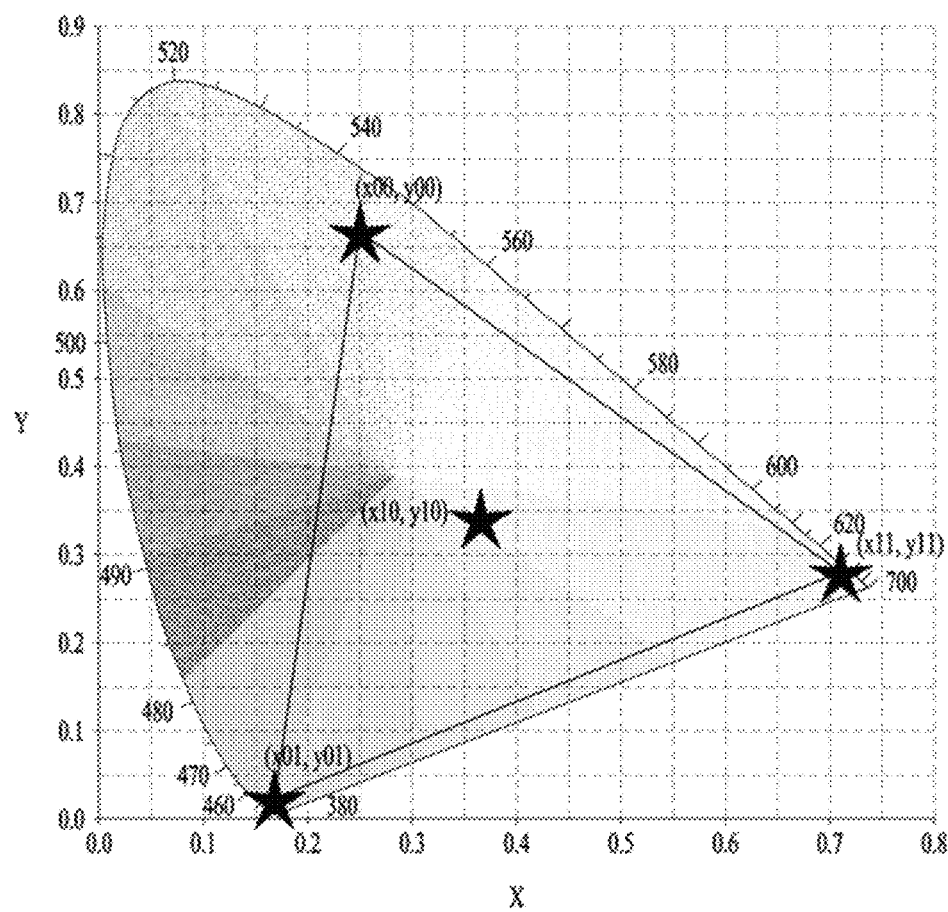
FIG. 12 is a diagram illustrating a method for modulating a binary digital signal in a color space.

Based on the above characteristics, a binary digital signal may be modulated. For example, when it is assumed that the range of colors that may be expressed by a specific device is given as shown in FIG. 12, a binary bit stream corresponding to the star-shaped marks may be defined as shown in Table 2. That is, a signal may be modulated based on the Euclidean distance in the color space.

TABLE 2

| 4 CSK | Set Class 0 |
|---|---|
| 00 | (x00, y00) |
| 01 | (x01, y01) |
| 10 | (x10, y10) |
| 11 | (x11, y11) |

Figure 13:
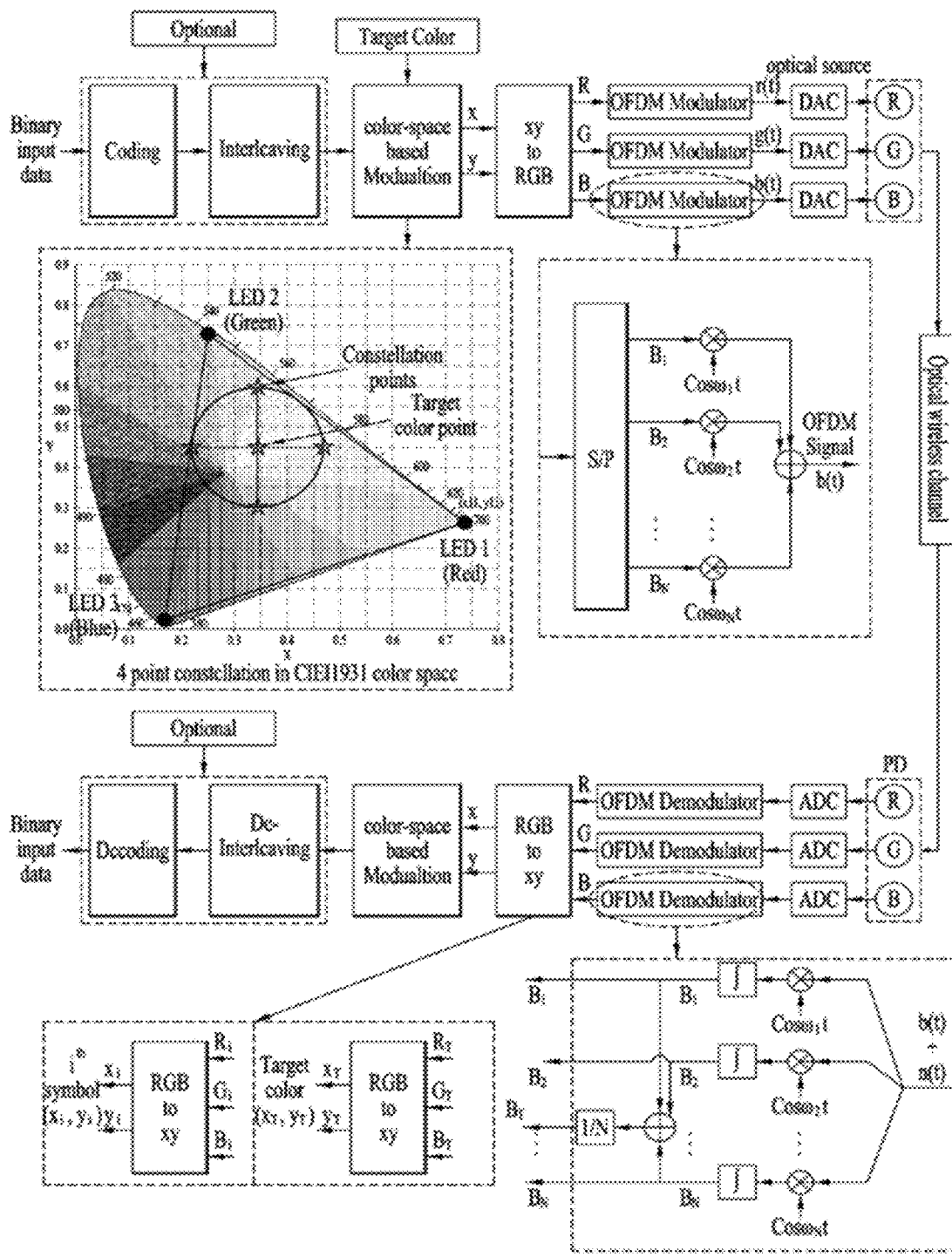
FIG. 13 is a diagram illustrating application of color-shift keying (CSK) modulation to MCM.

The above-described method applied to the MCM may be configured as shown in FIG. 13. That is, as in SCM, the transmitter i) transforms an analog signal generated through an OFDM modulator for R, G, and B values corresponding to (x, y) coordinates in a color space into an optical source through each light source, LED, and ii) transmits the sources on an optical channel. The receiver ii) receives a signal through a photo diode, ii) converts the analog signal to a digital signal through an OFDM demodulator, and iii) matches each signal of R, G, and B to color space (x,y) and decodes the signal by the (x, y) values.

The data transmission method based on the conventional optical wireless communication system described with reference to FIGS. 3 to 13 has a problem in that it is difficult to guarantee the decoding performance of the receiver due to the influence of an external interference light source. In particular, interference from strong sunlight may significantly reduce the decoding performance of the receiver. Accordingly, there is a need for a signal transmission and reception method in an optical wireless communication system that is robust to external interference.

In an example or implementation of the present disclosure, a method of minimizing interference based on the orbital angular momentum of a photon in optical wireless communication is proposed. In an example or implementation of the present disclosure, a transmitter transmits radio light, and a receiver decodes the radio light. An optical wireless communication system according to an example or implementation of the present disclosure may have the structure shown in FIG. 14.

Figure 14:
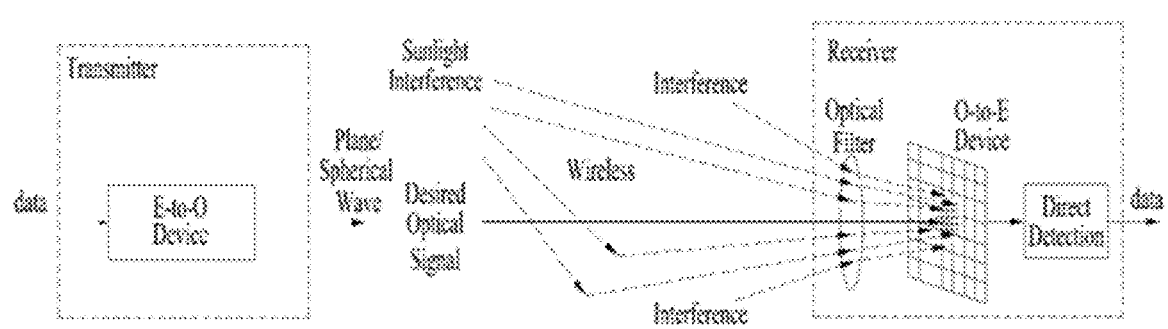
FIGS. 14 and 15 are diagrams illustrating optical wireless communication systems according to examples or implementations of the present disclosure.

Referring to FIG. 14, the transmitter converts data to be transmitted (e.g., electrical signal) into a photon (optical) source by an electrical-to-optical (E-to-O) device and transmits the photon source to the receiver in a wireless environment. The photon source may be referred to as radio light.

Here, the radio light may be interpreted as a wave corresponding to a set of photons and classified into a plane wave and a spherical wave according to the shape of a wavefront. The plane wave refers to a wave with a straight or planar wavefront. For example, the plane wave may be artificially generated by resonance as in a laser beam. The spherical wave refers to a wave in which the wavefront forms a concentric spherical surface around a wave source when the wave source is a point in space. When the spherical wave propagates away, wavefronts are almost parallel to each other, so that the spherical wave may be regarded as the plane wave from the viewpoint of the receiver.

When the receiver receives a desired optical signal including data in a wireless environment, the receiver may receive i) interference from other sources and ii) solar interference from the sun along with the desired optical signal. The receiver may decode the desired optical signal into the data based on i) an optical filter for determining the radio light used for the desired optical signal, ii) an O-to-E device that converts the receiver radio light into an electrical signal, and iii) direct detection for analyzing the signal.

Figure 15:
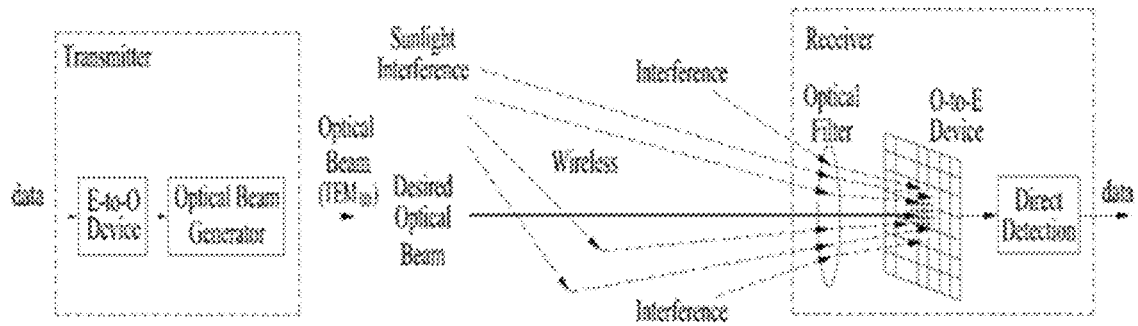

On the other hand, according to an example or implementation of the present disclosure shown in FIG. 15, the transmitter may transmit to the receiver in a wireless environment by i) converting data to be transmitted (e.g., electrical signal) into a photon source with an E-to-O device and ii) generating an optical beam with an optical beam generator.

In optics, radio light may be represented as a beam. In an example or implementation of the present disclosure, a case in which an optical beam is configured based on a transverse electromagnetic field/wave (TEM) mode corresponding to a resonant mode among transverse modes of electromagnetic radiation will be described.

The TEM mode may be divided into $TEM_{lm}$ by indices l and m according to beam formation. In general, the basic form of the TEM mode is a Gaussian beam, which is represented by $TEM_{00}$. $TEM_{00}$ refers to an optical beam in which a wave amplitude distribution on a cross-section perpendicular to an optical axis is expressed by a Gaussian function.

When the receiver receives a desired optical beam including data in a wireless environment, the receiver may receive i) interference from other sources and ii) solar interference from the sun along with the desired optical signal. The receiver may decode the desired optical beam into the data based on i) an optical filter for determining the radio light used for the desired optical beam, ii) an O-to-E device that converts the receiver radio light into an electrical signal, and iii) direct detection for interpreting the signal.

In the above-described two methods, if the receiver uses an optical filter to receive only a band corresponding to the desired optical signal/beam from the entire signal or uses polarized light, the receiver may not fully control interference because sunlight has energy in all bands and includes polarized light in all direction from the perspective of optics.

According to an example or implementation of the present disclosure, orbital angular momentum (OAM) has the following characteristics.

Figure 16:
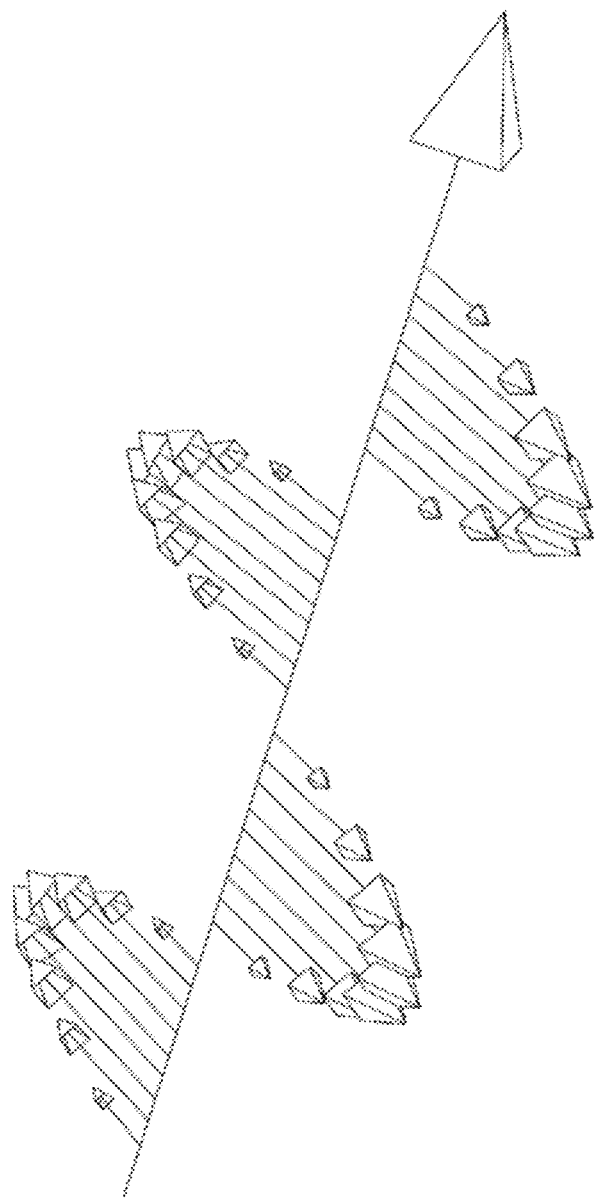
FIGS. 16 to 18 are diagrams for explaining the characteristics of orbital angular momentum (OAM) used in an optical wireless communication system according to an example or implementation of the present disclosure.

An electromagnetic wave consists of an electric field and a magnetic field. Angular momentum may be defined by a change in the direction of the electric field. When the direction change of the electric field oscillates perpendicular to the direction of propagation of one electromagnetic wave (or photon), it is called linear polarization. The linear polarization may be illustrated as shown in FIG. 16.

Light has linear momentum for each photon, which is expressed by $\hbar k_0$. The Dirac constant $\hbar$ is defined by $$\hbar = \frac{h}{2\pi} = 1.054571800(13) \times 10^{-34} \text{ J} \cdot \text{s},$$

and the Planck constant h is defined by $\hbar=6.62607015\times 10^{-34}$ J·s. Here, $k_0=2\pi/\lambda$, and the Dirac constant may also be called the reduced Planck constant.

Figure 17:
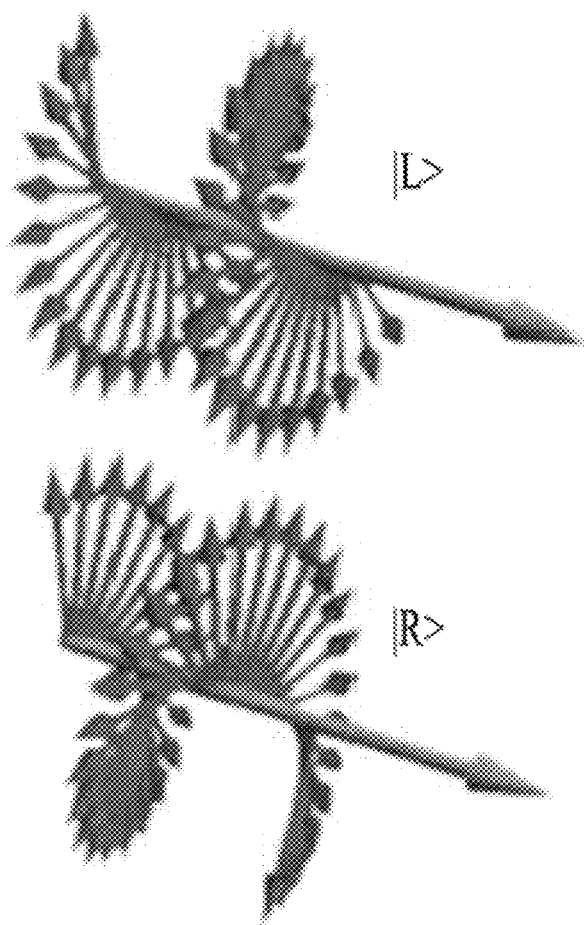

When the direction change of the electric field rotates around the direction of propagation of one electromagnetic wave (or photon), it is called circular polarization. The circular polarization may be illustrated as shown in FIG. 17.

Figure 18:
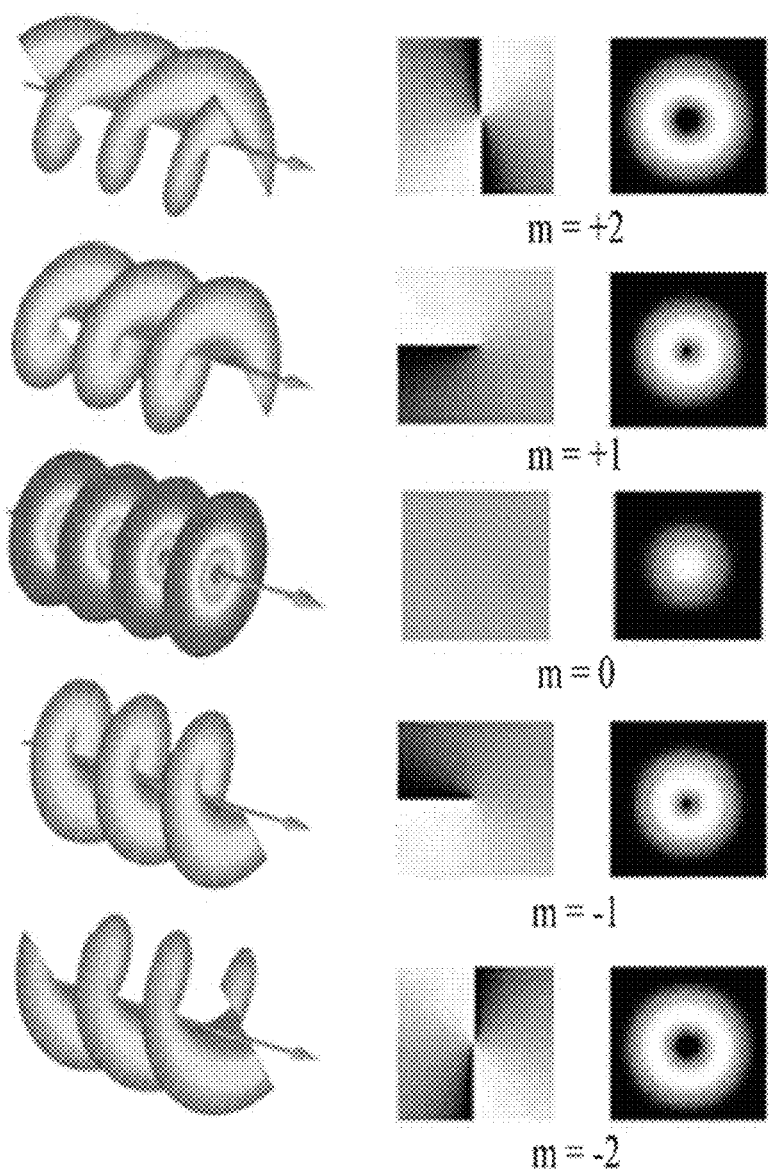
Figure 19:
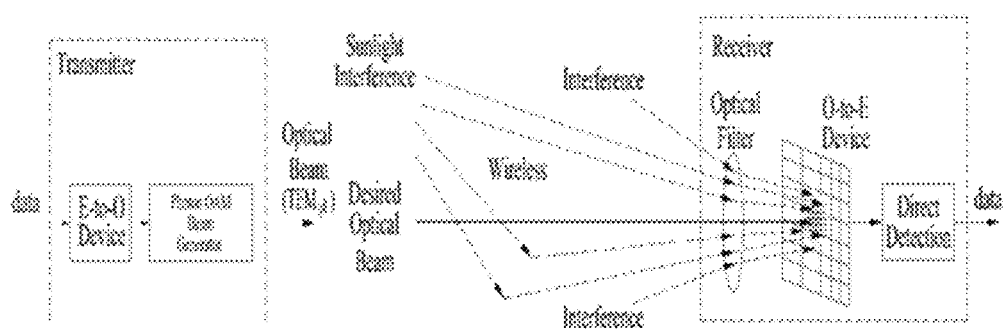
FIG. 19 is a diagram illustrating an optical wireless communication system according to an example or implementation of the present disclosure.

Light has spin angular momentum (SAM) for each photon, which is expressed by $\pm\hbar$. Wavefronts on which electromagnetic waves (or photons) propagate at the same time is called a phase front, and a plane phase front or plane wave means that all electromagnetic waves have the same phase on wavefronts propagating at the same time. Referring to FIG. 18, the phase front means a case where m=0.

In FIG. 18, the first column represents electromagnetic waves having the same phase in the direction of propagation on the same wavefront. The second column is a phase diagram showing phase distributions viewed in the direction of propagation at a single time point. The third column is an intensity diagram showing intensity distributions of light viewed in the direction of propagation at a single time point.

When an electromagnetic wave is not the plane wave (when m is not zero), it is said that the electromagnetic wave has a helical phase front, and in general, it may be referred to as an electromagnetic wave with OAM. Light has OAM for each photon, which is expressed by m$\hbar$. Since the OAM is the definition of a wavefront, electromagnetic waves at each point may be linearly polarized or circularly polarized. The OAM may be called Laguerre-Gaussian modes (e.g., LG beam) or cylindrical transverse mode patterns, TEM(pl) in the optical definition. In an example or implementation of the present disclosure, it is defined for TEM(pl) that p=0 and 1 is a value corresponding to the OAM mode index. For example, OAM mode 3 is TEM(03). In the present disclosure, only a case of p=0 is assumed for convenience of description, but the present disclosure may be applied in the same way even when p is not zero.

Referring to the phase diagram of FIG. 18, in the OAM mode, the number of times that the phase rotates by 2pi is the same as the index order. For example, when m=+2, the phase rotates twice in the right direction.

Referring to the intensity diagram of FIG. 18, the intensity distribution of the OAM mode has the shape of a single ring. Unless p=0, the number of rings may increase. As the OAM mode index increases, the radius of the ring may increase.

In an example or implementation of the present disclosure, both a radio source and a photon source refer to an electromagnetic wave. However, to distinguish from the conventional communication, the frequency bands of the radio and photon sources according to an example or implementation of the present disclosure are exemplarily limited as follows. The frequency band of the radio source is several terahertz or less, which is defined as a band considered in general wireless communication systems. The frequency band of the photon source is greater than several terahertz, which is defined as a band (e.g., infrared, ultraviolet, visible light, etc.) considered in optical wireless communication systems. In a special purpose environment, the methods proposed in the present disclosure may be equally applied to x-rays and gamma rays.

Implementation 1. Optical Wireless Communication Transmission and Reception Method Based on Photon OAM In an example or implementation of the present disclosure, a transmission and reception method in an optical wireless communication system based on photon OAM is proposed with reference to FIGS. 16 to 18. Specifically, initial access based on legacy links and initial access based on broadcast messages will be described.

1.1. Initial Access Based on Legacy Link

A transmitting UE and receiving UE may share initial information for optical wireless communication through legacy links (e.g., LTE, LTE-A, NR, WiFi, Bluetooth, etc.). The initial information for optical wireless communication may include the following.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an on/off keying (OOK) method may be used for single carrier modulation, or ii) an orthogonal frequency-division multiplexing (OFDM) method may be used as for multi-carrier modulation, which may be agreed between the transmitting UE and receiving UE.

1.2. Initial Access Based on Broadcast Message

A transmitting UE and receiving UE may share initial information based on broadcast messages. For example, the transmitting UE and receiving UE may broadcast a predetermined broadcast message on an optical or radio resource as in broadcast over a physical broadcast channel (PBCH) or common control channel of LTE/LTE-A in order to share the initial information for optical wireless communication. The initial information for optical wireless communication may be as follows.

i) Band for transmission and reception: This may mean a frequency band or light wavelength range for transmission and reception of data and control information.

ii) Polarization for transmission and reception: This may mean a polarization direction for transmission and reception of data and control information. For example, it may be agreed between the transmitting UE and receiving UE that data and control information is exchanged based on only vertical polarization for interference control.

iii) OAM mode for transmission and reception: This may mean an OAM mode index for transmission and reception of data and control information.

iv) Baseband modulation for transmission and reception: This may mean a baseband modulation method for transmission and reception of data and control information. For example, for data modulation and demodulation, i) an OOK method may be used for single carrier modulation, or ii) an OFDM method may be used as for multi-carrier modulation, which may be agreed between the transmitting UE and receiving UE.

Implementation 2. Optical Wireless Communication Transmitter and Receiver Based on Photon OAM 2.1. Transmitting UE and Receiving UE in OAM-based Optical Wireless Communication In an example or implementation of the present disclosure shown in FIG. 16, proposed is a system including: i) a transmitting UE transmitting a signal based on a photon OAM beam generator; and ii) a receiving UE using an optical filter for distinguishing a desired OAM beam from optical interference. According to the proposed system, it is possible to minimize interference from sunlight or other sources having the same band and same polarization as those of a desired optical beam.

If radio light is interpreted as an electromagnetic wave, the TEM mode may be classified depending on to the shape of a beam. The basic form of the TEM mode is generally a Gaussian beam, which is represented by $TEM_{00}$. Hermite-Gaussian (HG) modes with rectangular transverse mode patterns are represented by $TEM_{mn}$. LG modes with cylindrical transverse mode patterns are represented by $TEM_{pl}$. In an example or implementation of the present disclosure, the LG modes ($TEM_{pl}$) may be represented by photon OAM.

2.2. Transmitting UE

A transmitting UE may convert an electric source including data to be transmitted into an optical source with an E-to-O device. The converted optical source may be converted into a photon OAM beam by a photon OAM beam generator as follows.

i) The transmitting UE may convert the optical source into a Gaussian beam ($TEM_{00}$) by passing the optical source through a resonator and then convert the Gaussian beam into the photon OAM beam ($TEM_{pl}$) with a spiral phase plate.

ii) The transmitting UE may convert the optical source to a Gaussian beam ($TEM_{00}$) by passing the optical source through a resonator, and convert the Gaussian beam into the photon OAM beam ($TEM_{pl}$) by reflecting the Gaussian beam on a phase hologram with a spiral phase pattern.

iii) The transmitting UE may convert the optical source to a Gaussian beam ($TEM_{00}$) by passing the optical source through a resonator and convert the Gaussian beam into the photon OAM beam ($TEM_{pl}$) by reflecting the Gaussian beam on a phase hologram with a fork diffraction pattern.

iv) The transmitting UE may convert the optical source to a Hermite-Gaussian beam ($TEM_{mn}$) by passing the optical source through a resonator and convert the Hermite-Gaussian beam into the photon OAM beam ($TEM_{pl}$) by passing the Hermite-Gaussian beam through a cylindrical lens HG-LG mode converter (e.g., pi/2 mode converter).

In addition to methods i) to iv) described above, various methods capable of generating a photon OAM beam may be applied to examples or implementations of the present disclosure.

2.3. Receiving UE 2.3.1. Optical Filter

An optical filter provided in a receiving UE may include a general optical filter or a polarizing filter. The general optical filter is an optical element for receiving a band corresponding to a desired optical beam. The optical filter may include a filter that transmits with a constant transmittance regardless of wavelengths, a correction filter that controls light intensity in a specific wavelength range, and a light contrast filter. The optical filter may be classified into an infrared range filter, a visible range filter, an ultraviolet range filter, a vacuum ultraviolet range filter, and so on depending on frequency ranges. Filters in each range may have different materials and structures.

Alternatively, the optical filter may be a polarized light filter (polarization filter). The polarization filter is a filter based on polarization, i.e., a filter for passing only light vibrating in a specific direction in order to receive polarized light corresponding to a desired optical beam. In general, polarization mainly occurs when obliquely projection light is reflected from a uniform surface. Therefore, if the polarization filter is used to block light reflected from the surface of a glass window or object, a clear and sharp image may be obtained. For example, a camera has a polarization filter capable of adjusting and rotating a polarization direction. If an autofocus camera uses the polarization filter, the autofocus camera may not recognize light and thus lose a focus because only wavelengths vibrating in one direction remain. A solution to this phenomenon is a circular polarization filter.

2.3.2. Lens

A lens is a device for focusing a received optical source to a focal point based on the effect of refraction.

2.3.2.1. Focal Point Control Based on Wavelength

Figure 20:
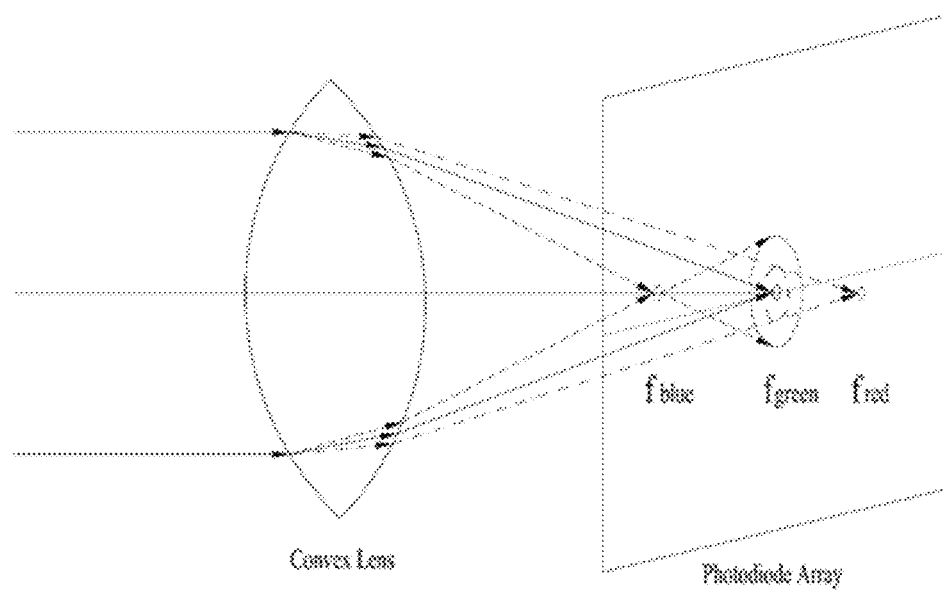
FIGS. 20 to 24 are diagrams for explaining optical filters applicable to an optical wireless communication systems according to an example or implementation of the present disclosure and acquisition of a desired beam using the same.

Referring to FIG. 20, an optical source passing through a convex lens or a Fresnel lens has different focal points depending on wavelengths. Based on this characteristic, the receiving UE may control the intensity concentration of the optical source received on a photodiode array. The photodiode array according to an example or implementation of the present disclosure refers to an array in which a plurality of light receiving elements performing O-to-E conversion are distributed in a specific area.

For example, when the focal point of green light is denoted by $f_{green}$ in FIG. 20, the focal points of blue light and red light are $f_{blue}$ and $f_{red}$, respectively. It may be seen that the blue light, green light, and red light have different focal points. Based on this characteristic, the receiving UE may control the intensity of green light to be concentrated at the center of the photodiode array, the intensity of red light to spread over a larger area, and the intensity of blue light to spread over a further larger area.

Based on the above control, the receiving UE may receive a green light signal at the focal point of the green light more efficiently. The receiving UE may control focal points depending on wavelengths by i) controlling the thickness of the convex lens or Fresnel lens or ii) controlling the distance between the convex lens and the photodiode array.

2.3.2.2. Focal Point Control Based on OAM Mode

Figure 21:
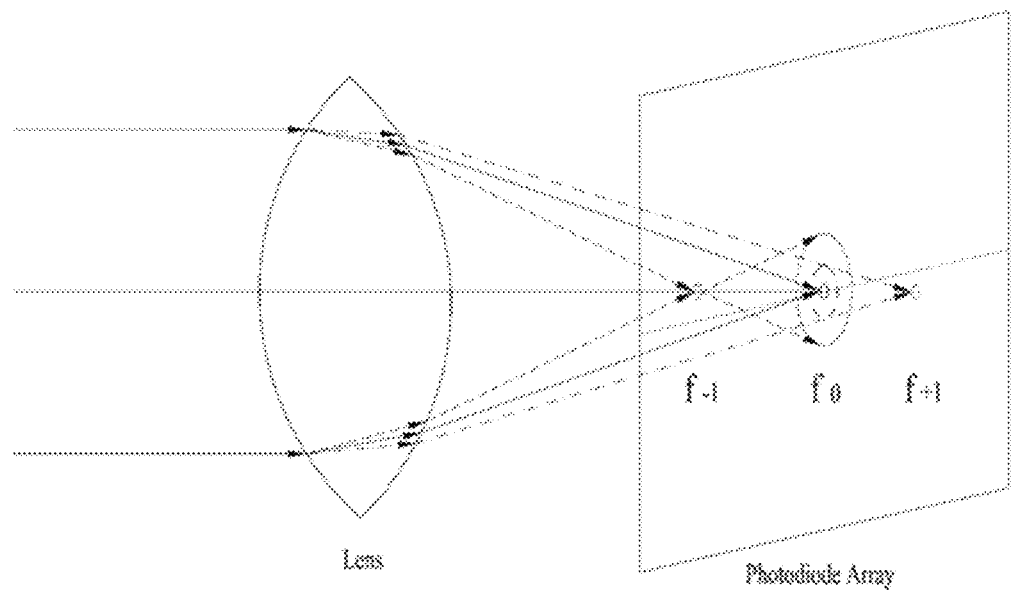

Referring to FIG. 21, an OAM optical source passing through a lens with an arbitrary refraction angle (e.g., Fresnel lens) has different focal points depending on mode indexes. Based on this characteristic, the receiving UE may control the intensity concentration of OAM modes received on the photodiode array.

For example, it may be seen from FIG. 21 that OAM mode +1, OAM mode 0, and OAM mode −1 have different focal points. In OAM mode 0, the receiving UE may control the intensity to be concentrated at the center of the photodiode array. In OAM mode −1, the receiving UE may control the intensity to spread over a larger area. In OAM mode +1, the receiving UE may control the intensity to spread over a further larger area.

When the focal point of OAM mode 0 is $f_0$, the focal point of mode index m, $f_m$ may be approximated as follows: $f_m = f_0(1+C \cdot m)$, where constant C is an OAM dispersion coefficient.

The receiving UE may control the focal points of OAM modes by i) controlling the thickness of the lens or Fresnel lens or ii) controlling the distance between an arbitrary lens and the photodiode array.

2.3.3. Fresnel Zone Plate

A Fresnel zone plate is a device for focusing a received optical source to a focal point based on the effect of diffraction. Specifically, the zone plate or Fresnel zone plate is a device for focusing materials with light or wave characteristics. Unlike lenses or curved mirrors, the zone plate may use diffraction instead of reflection and refraction. The zone plate consists of a set of radially symmetric rings that alternate between opaque and transparent areas, which is known as a Fresnel zone. Light hitting the zone plate is diffracted around an opaque area. The areas may be spaced apart so that diffracted light structurally interferes at a desired focal point to produce an image.

Figure 22:
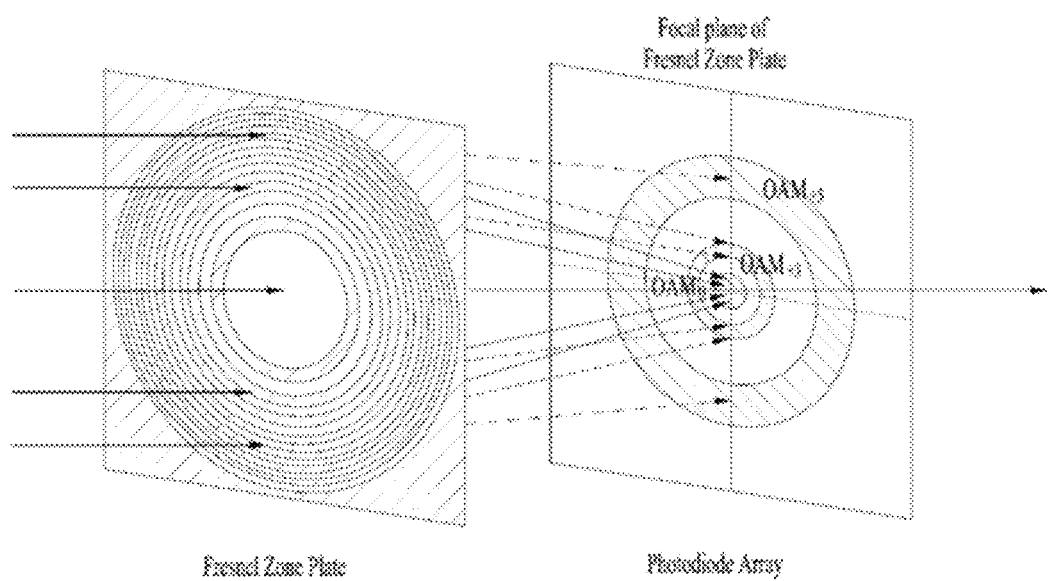

It may be seen from FIG. 22 that an optical source passing through the Fresnel zone plate have different wave characteristics or have different intensity distributions in a focal plane depending on OAM mode indexes. Based on these characteristics, the receiving UE may control the intensity distribution of the optical source received on the photodiode.

Referring to FIG. 22, when the optical source passing through the Fresnel zone plate is i) natural light such as sunlight or ii) plane wave light such as linearly polarized light or circularly polarized light, the intensity thereof may be concentrated at the center of the focal plane of the Fresnel zone plate.

When the optical source passing through the Fresnel zone plate is a plane wave light beam and a Gaussian beam, the intensity of the optical source may be distributed with a Gaussian distribution with respect to the center of the photodiode, which is located at the focal plane of the Fresnel zone plate.

When the optical source passing through the Fresnel zone plate is an LG beam corresponding to helical wave light, the intensity may be distributed in the form of a ring with respect to the center of the photodiode located at the focal plane of the Fresnel zone plate while maintaining the characteristics of an OAM state.

For example, in FIG. 22, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring. In OAM mode +5, the receiving UE may control the intensity to spread over a further larger area in the form of a ring. In this case, for general plane wave light such as i) natural light such as sunlight and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode by i) controlling a pattern according to the ring configuration of the Fresnel zone plate or ii) controlling the distance between the Fresnel zone plate and the photodiode.

2.3.4. Photon Sieve

A photon sieve is a device for focusing a received optical source to a focal point based on diffraction and interference effects. The photon sieve may include a flat sheet filled with pinholes arranged in a pattern similar to the ring of the Fresnel zone plate described above. The photon sieve may provide a much sharper focal point than the zone plate. The photon sieve is manufactured to include pinholes with various sizes and patterns and the characteristics of the focal point operation may vary depending on applications, so that the photon sieve may be used in various ways.

The receiving UE may control the intensity distribution of the optical source received on the photodiode based on i) wave characteristics of the optical source passing through the photon sieve or ii) the characteristic that the intensity distribution at the focal plane varies according to the OAM mode index.

When the optical source passing through the photon sieve is i) natural light such as sunlight or ii) plane wave light such as linearly or circularly polarized light, the intensity of the optical source may be concentrated at the center of the photodiode array located at the focal plane of the photon sieve.

When the optical source passing through the photon sieve is a plane wave light beam and a Gaussian beam, the intensity of the optical source is distributed with a Gaussian distribution with respect to the center of the photodiode array located at the focal plane of the photon sieve.

When the optical source passing through the photon sieve is an LG beam corresponding to helical wave light, the intensity may be distributed in the form of a ring with respect to the center of the photodiode array located at the focal plane of the photon sieve while maintaining the characteristics of an OAM state.

Figure 23:
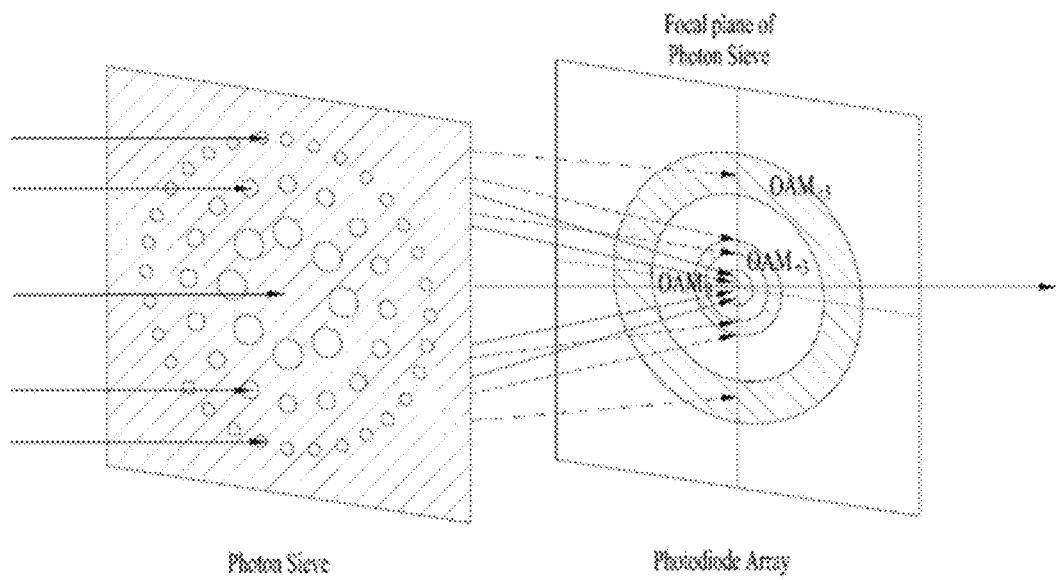

For example, in FIG. 23, OAM mode 0, OAM mode +3, and OAM mode +5 have different intensity distributions. In OAM mode 0, the receiving UE may control the intensity to be concentrated at the center of the photodiode with the Gaussian distribution. In OAM mode +3, the receiving UE may control the intensity to spread over a larger area in the form of a ring, In OAM mode +5, the receiving UE may control the intensity to spread over a further larger area in the form of a ring. In this case, for general plane wave light such as i) natural light such as sunlight, and ii) linearly polarized or circularly polarized light, the intensity thereof may be concentrated in a very small area at the center of the photodiode. This area is smaller than the area in OAM mode 0 where the intensity is distributed at the center of the photodiode with the Gaussian distribution.

The receiving UE may control the intensity distribution of the optical source received on the photodiode array by i) controlling a pattern according to the pinhole configuration of the photon sieve or ii) controlling the distance between the photon sieve and the photodiode array.

2.3.5. Phase Mask

A phase mask is a device for controlling a propagation direction according to the characteristics of a received optical source based on the effect of diffraction. The phase mask may include optical elements.

The receiving UE may control the position of the intensity distribution of the optical source received on the photodiode array based on i) the wave characteristics of the optical source passing through the phase mask (or pattern mask) or ii) the characteristic that the propagation direction of a beam changes depending on the OAM mode index.

Figure 24:
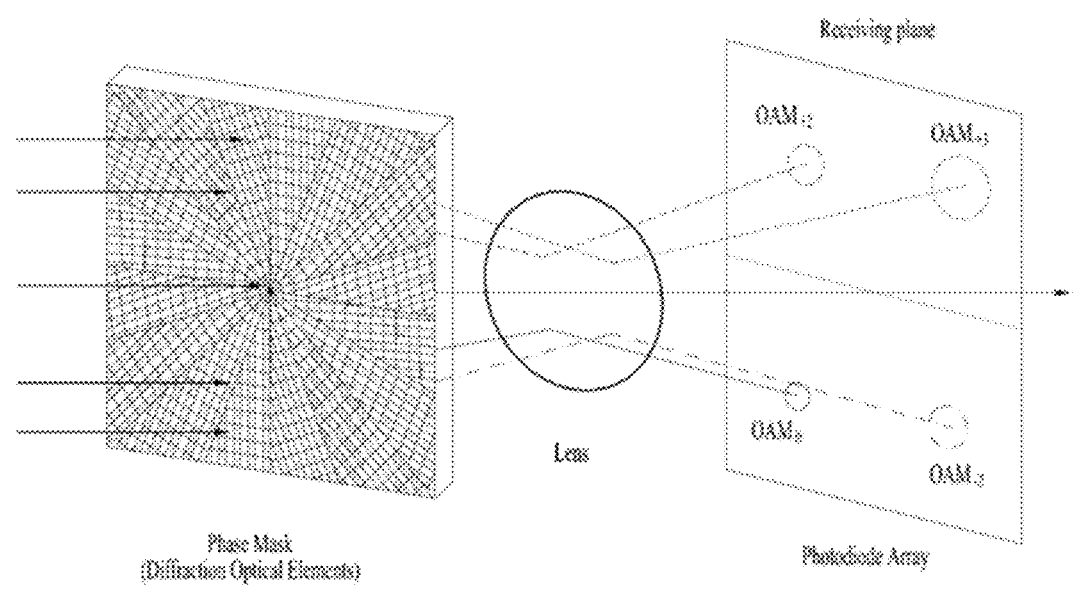

For example, it may be seen from FIG. 24 that OAM mode 0, OAM mode +2, OAM mode −2, and OAM mode +3 have different intensity distribution positions. In this case, since general plane wave light such as i) natural light such as sunlight and ii) linearly or circularly polarized light has the same phase characteristics as a plane wave of OAM mode 0, the intensity thereof may be distributed in the third quadrant of a receiving plane in which the intensity distribution of OAM mode 0 is located. On the other hand, a lens serves to focus the optical source passing through the phase mask on the receiving plane.

The receiving UE may control the position of the intensity distribution of the optical source received on the photodiode array by i) controlling the phase elements constituting the phase mask or ii) controlling the distance between the phase mask and the photodiode array, the distance between the phase mask and the lens, and/or the distance between the lens and the photodiode array.

According to an example or implementation of the present disclosure, two or more of the above-described optical filters (e.g., lens, Fresnel zone plate, photon sieve, and phase mask) may be combined and applied to obtain each characteristic multiply. For example, the receiving UE may i) receive a specific wavelength with the general optical filter to control its received wavelength, ii) receive desired polarized light with the polarization filter, and iii) distinguish plane wave and spiral wave modes based on the characteristics of wave light with the photon sieve.

Implementation 3. Interference Cancellation or Mitigation Based on Diffraction Properties 3.1 Interference Mitigation Based on Lens 3.1.1. Focal Point Control Based on Wavelength According to an example or implementation of present disclosure, if the optical filter of a receiving UE is configured with a convex lens (or Fresnel lens), the receiving UE may remove band(s) except for wavelength(s) agreed between the receiving UE and a transmitting UE based on the characteristic that an optical source passing through the convex lens has different focal points depending on the wavelength. For example, when the wavelength agreed between the transmitting UE and receiving UE is w0, the distance between the convex lens (or Fresnel lens) and photodiode array of the receiving UE may be set to be the focal plane of w0.

According to an example or implementation of the present disclosure, the receiving UE may perform data detection and decoding by performing optical-to-electrical (O-to-E) conversion of the intensities of some photodiodes of the photodiode array in which the intensity of w0 is distributed. In this case, considering that the intensities of predetermined or adaptively configured photodiodes correspond to interference intensities, the receiving UE may perform no O-to-E conversion thereof. According to another example or implementation of the present disclosure, the receiving UE may perform no O-to-E conversion by regarding the intensities of photodiodes not exceeding a predetermined or adaptively configured threshold as interference.

Figure 25:
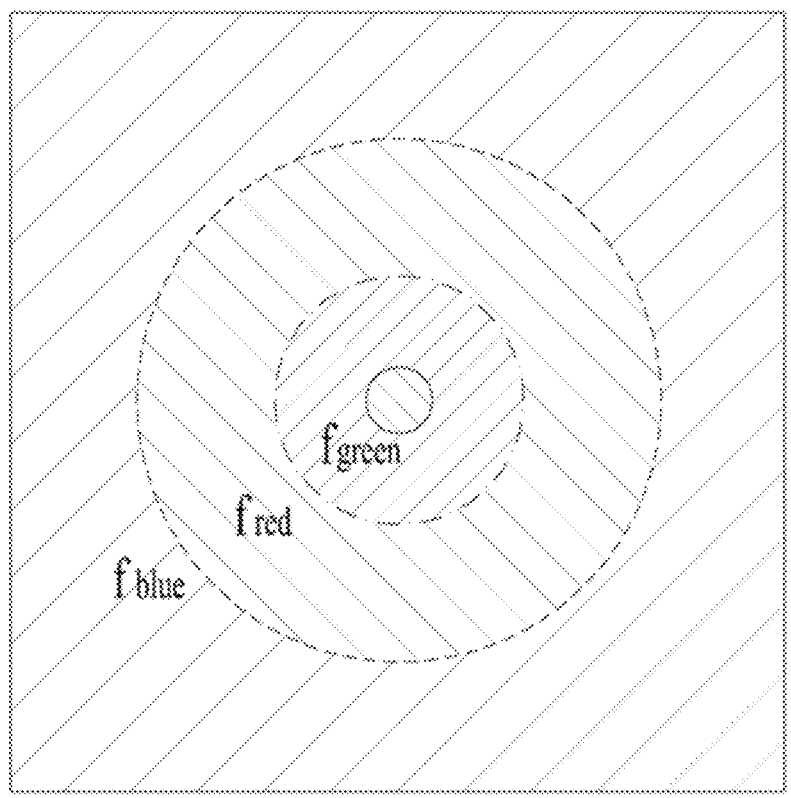
FIGS. 25 to 29 are diagrams for explaining methods of cancelling or mitigating interference based on diffraction in an optical wireless communication system according to an example or implementation of the present disclosure.

For example, it is assumed that the intensity of the optical source passing through the convex lens (or Fresnel lens) is distributed in the photodiode array as shown in FIG. 25. If w0 is f_green, the receiving UE may perform the O-to-E conversion on only photodiodes corresponding to f_green and may not perform the O-to-E conversion of the intensities of photodiodes in other areas including f_red and f_blue.

3.1.2. Focal Point Control Based on OAM Mode

According to an example or implementation of present disclosure, if the optical filter of the receiving UE is configured with an arbitrary lens (or Fresnel lens), the receiving UE may remove OAM mode(s) except for OAM mode(s) agreed between the receiving UE and transmitting UE based on the characteristic that an optical source passing through the arbitrary lens (or Fresnel lens) has different focal points depending on the OAM mode thereof.

For example, when the OAM mode agreed between the transmitting UE and receiving UE is mode 1, the distance between the arbitrary lens (or Fresnel lens) and photodiode array of the receiving UE may be set to the focal plane of mode 1.

According to an example or implementation of the present disclosure, the receiving UE may perform data detection and decoding by performing O-to-E conversion of the intensities of some photodiodes of the photodiode array in which the intensity of mode 1 is distributed. In this case, considering that the intensities of predetermined or adaptively configured photodiodes correspond to interference intensities, the receiving UE may perform no O-to-E conversion thereof. According to another example or implementation of the present disclosure, the receiving UE may perform no O-to-E conversion by regarding the intensities of photodiodes not exceeding a predetermined or adaptively configured threshold as interference.

Figure 26:
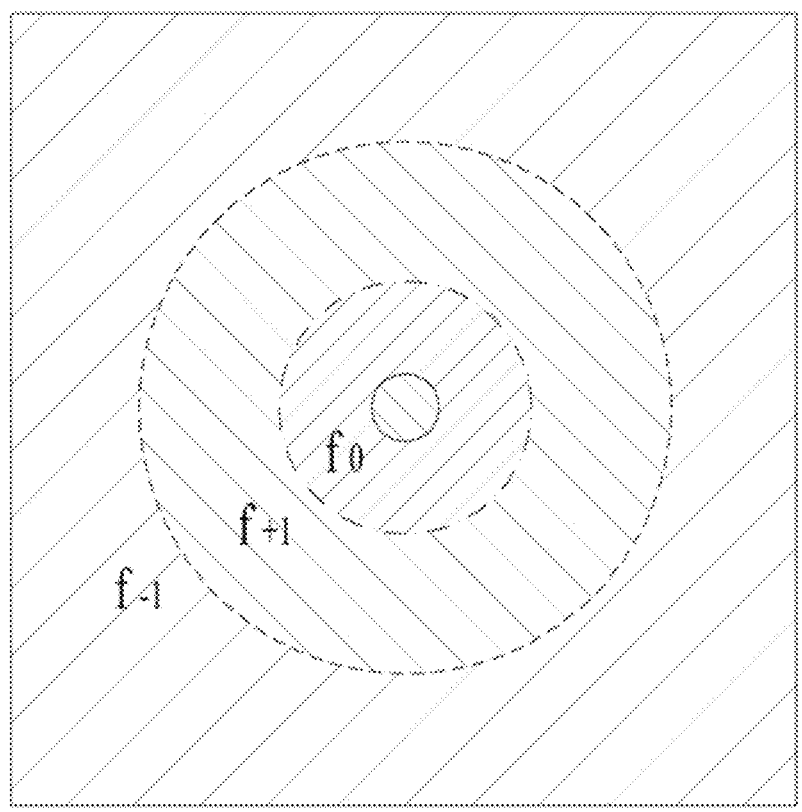

Referring to FIG. 26, since the intensity of sunlight is concentrated at a focal point corresponding to OAM mode 0, the receiving UE may perform interference cancellation for an optical source corresponding to sunlight.

It is assumed that the intensity of the optical source passing through the arbitrary lens (or Fresnel lens) is distributed in the photodiode array as shown in FIG. 26. If the desired signal is $f_0$, the receiving UE may perform the O-to-E conversion on only photodiodes corresponding to $f_0$ and may not perform the O-to-E conversion of the intensities of photodiodes in other areas including $f_{+1}$ and $f_{-1}$.

3.2 Interference Mitigation Based on Fresnel Zone

According to an example or implementation of present disclosure, if the optical filter of the receiving UE is configured with a Fresnel zone plate, the receiving UE may remove OAM mode(s) except for OAM mode(s) agreed between the receiving UE and transmitting UE based on the characteristic that an optical source passing through the Fresnel zone plate has different intensity distributions on a focal plane depending on the OAM mode thereof. For example, the distance between the Fresnel zone plate and photodiode array of the receiving UE may be set to be the focal plane of mode 0.

When the OAM mode agreed between the transmitting UE and receiving UE is mode 1, the receiving UE may perform data detection and decoding by performing O-to-E conversion of the intensities of some photodiodes of the photodiode array in which the intensity of mode 1 is distributed. In this case, considering that the intensities of predetermined or adaptively configured photodiodes correspond to interference intensities, the receiving UE may perform no O-to-E conversion thereof. According to another example or implementation of the present disclosure, the receiving UE may perform no O-to-E conversion by regarding the intensities of photodiodes not exceeding a predetermined or adaptively configured threshold as interference.

Figure 27:
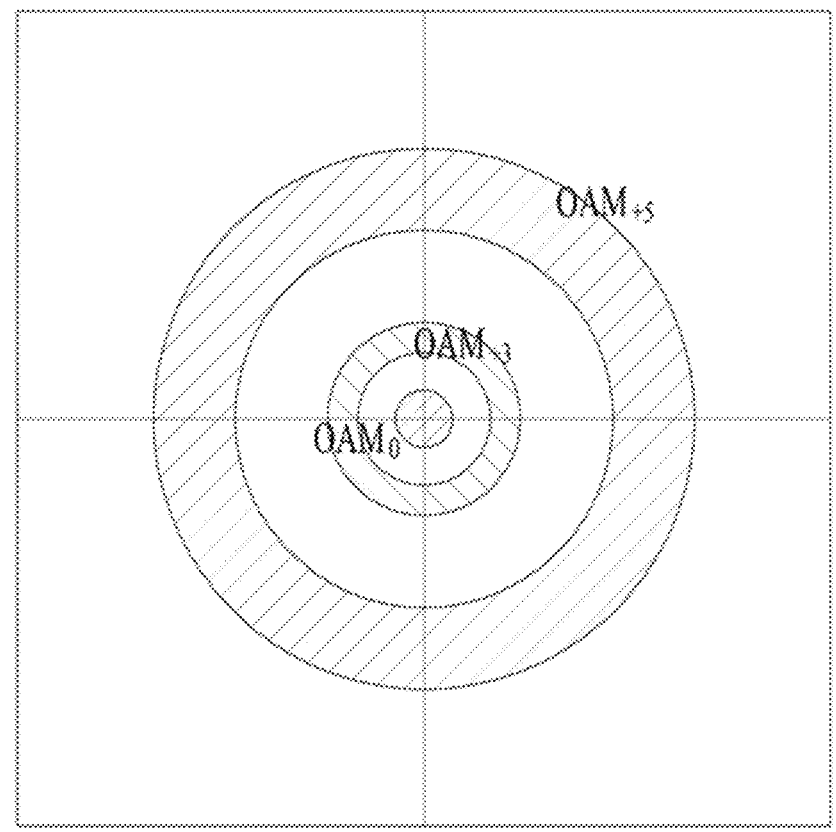

Referring to FIG. 27, since the intensity of sunlight is concentrated at a focal point corresponding to OAM mode 0, the receiving UE may perform interference cancellation for an optical source corresponding to sunlight.

It is assumed that the intensity of the optical source passing through the Fresnel zone plate is distributed in the photodiode array as shown in FIG. 27. If the desired signal is $OAM_{+3}$, the receiving UE may perform the O-to-E conversion on only photodiodes corresponding to $OAM_{+3}$ and may not perform the O-to-E conversion of the intensities of photodiodes in other areas including $OAM_0$ and $OAM_{+5}$.

3.3 Interference Mitigation Based on Photon Sieve

According to an example or implementation of present disclosure, if the optical filter of the receiving UE is configured with a photon sieve, the receiving UE may remove OAM mode(s) except for OAM mode(s) agreed between the receiving UE and transmitting UE based on the characteristic that an optical source passing through the photon sieve has different intensity distributions on a focal plane depending on the OAM mode thereof. For example, the distance between the photon sieve and photodiode array of the receiving UE may be set to be the focal plane of mode 0.

When the OAM mode agreed between the transmitting UE and receiving UE is mode 1, the receiving UE may perform data detection and decoding by performing O-to-E conversion of the intensities of some photodiodes of the photodiode array in which the intensity of mode 1 is distributed. In this case, considering that the intensities of predetermined or adaptively configured photodiodes correspond to interference intensities, the receiving UE may perform no O-to-E conversion thereof. According to another example or implementation of the present disclosure, the receiving UE may perform no O-to-E conversion by regarding the intensities of photodiodes not exceeding a predetermined or adaptively configured threshold as interference.

Figure 28:
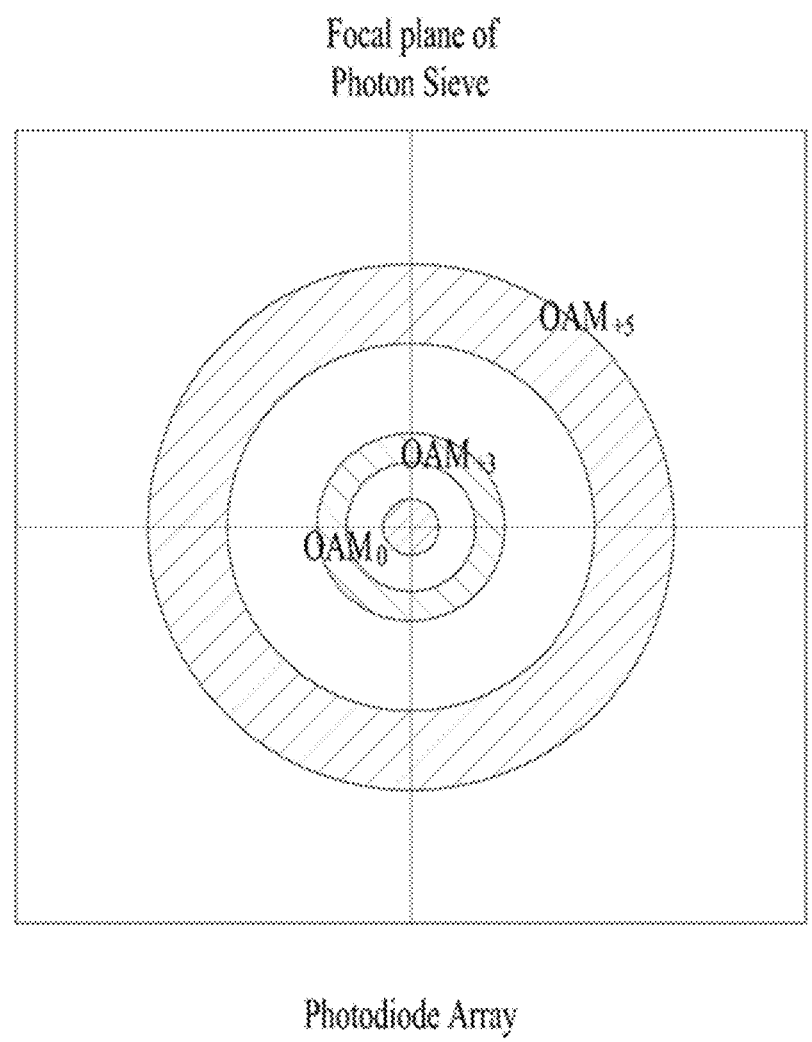

Referring to FIG. 28, since the intensity of sunlight is concentrated at a focal point corresponding to OAM mode 0, the receiving UE may perform interference cancellation for an optical source corresponding to sunlight.

It is assumed that the intensity of the optical source passing through the photon sieve is distributed in the photodiode array as shown in FIG. 28. If the desired signal is $OAM_{+3}$, the receiving UE may perform the O-to-E conversion on only photodiodes corresponding to $OAM_{+3}$ and may not perform the O-to-E conversion of the intensities of photodiodes in other areas including $OAM_0$ and $OAM_{+5}$.

3.4 Interference Mitigation Based on Phase Pattern Mask

According to an example or implementation of present disclosure, if the optical filter of the receiving UE is configured with a phase pattern mask, the receiving UE may remove OAM mode(s) except for OAM mode(s) agreed between the receiving UE and transmitting UE based on the characteristic that an optical source passing through the phase pattern mask has different intensity distribution positions on a receiving plane depending on the OAM mode thereof. For example, the distance between the photon sieve and photodiode array of the receiving UE may be set to be the focal plane of mode 0. For example, the direction of propagation to the receiving plane through the phase pattern mask may vary for each mode. In this case, a lens may be provided between the phase pattern mask and the photodiode array so that the propagation in each mode may be focused on the photodiode array.

When the OAM mode agreed between the transmitting UE and receiving UE is mode 1, the receiving UE may perform data detection and decoding by performing O-to-E conversion of the intensities of some photodiodes of the photodiode array in which the intensity of mode 1 is distributed. In this case, considering that the intensities of predetermined or adaptively configured photodiodes correspond to interference intensities, the receiving UE may perform no O-to-E conversion thereof. According to another example or implementation of the present disclosure, the receiving UE may perform no O-to-E conversion by regarding the intensities of photodiodes not exceeding a predetermined or adaptively configured threshold as interference.

Figure 29:
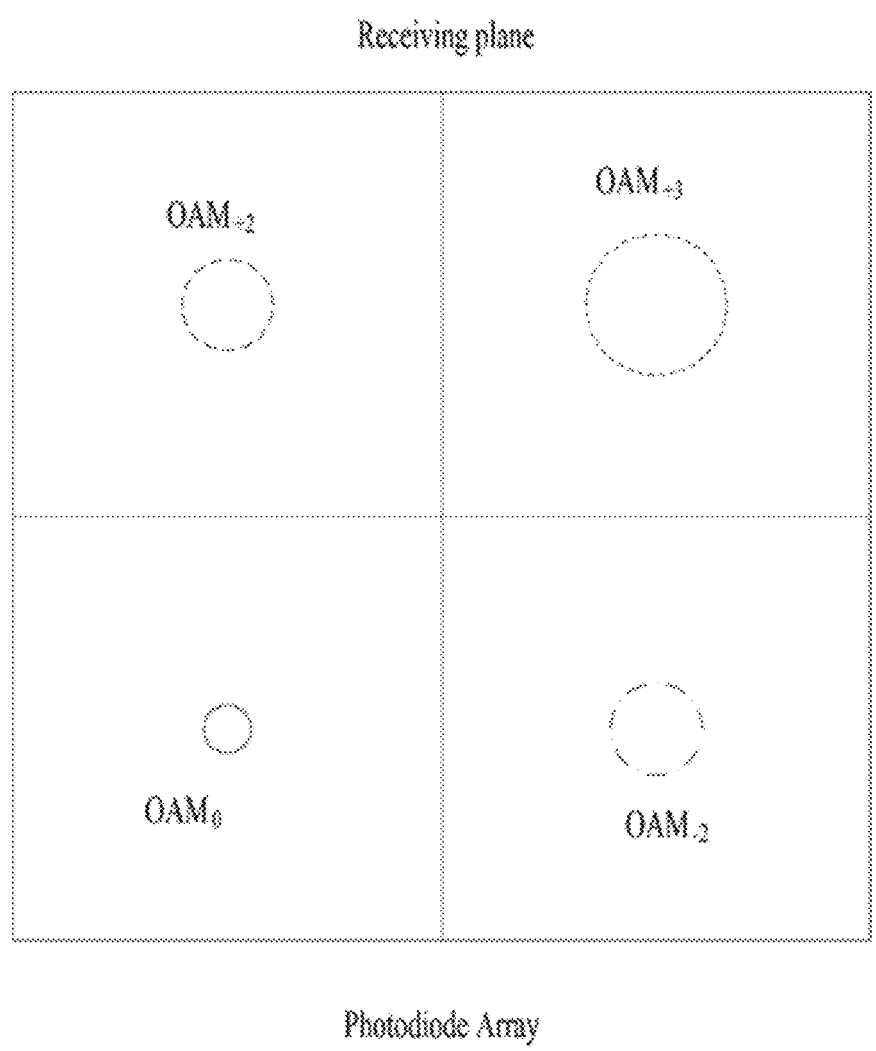

Referring to FIG. 29, since the intensity of sunlight is concentrated at a focal point positioned in the propagation direction of OAM mode 0, the receiving UE may perform interference cancellation for an optical source corresponding to sunlight.

It is assumed that the intensity of the optical source passing through the phase pattern mask and lens is distributed in the photodiode array as shown in FIG. 29. If the desired signal is $OAM_{+2}$, the receiving UE may perform the O-to-E conversion on only photodiodes corresponding to $OAM_{+2}$ and may not perform the O-to-E conversion of the intensities of photodiodes in other areas including $OAM_0$, $OAM_{-2}$, and $OAM_{+3}$.

For the interference cancellation according to an example or implementation of the present disclosure, two or more of the optical filters may be used together in order to obtain the above-described characteristics multiply. That is, the interference cancellation may be performed in two or more stages. For example, the receiving UE may i) receive a specific wavelength with the general optical filter to control a received wavelength, ii) filter desired polarization with the polarization filter within the received area, and iii) identify the intensity of a plane wave mode and the intensity of a spiral wave mode based on the characteristics of wave light with the photon sieve.

3.5 Interference Cancellation Method

Figure 30:
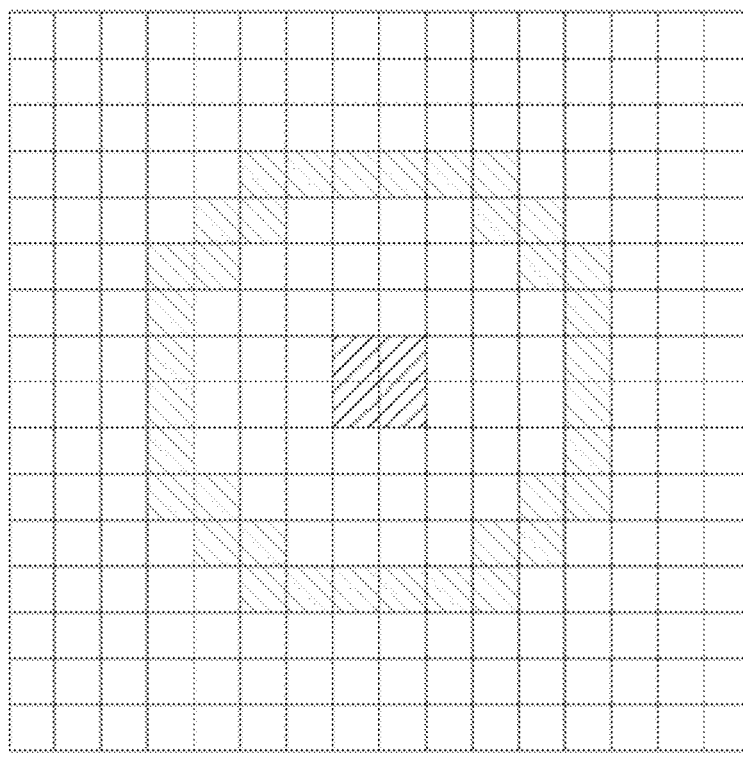
FIGS. 30 and 31 are diagrams for explaining methods of cancelling interference by a receiving user equipment (UE) in an optical wireless communication system according to an example or implementation of the present disclosure.
Figure 31:
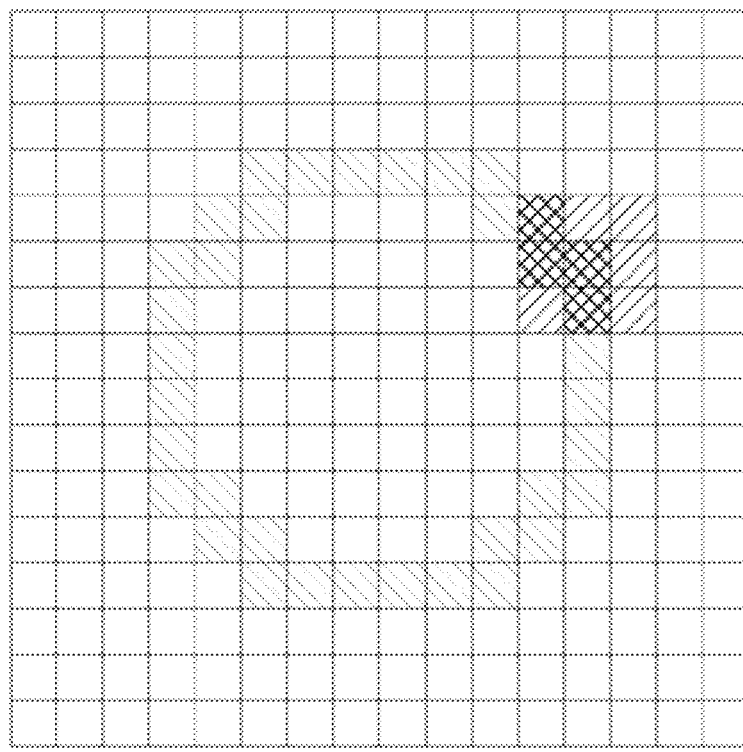

The interference cancellation based on the above-described characteristics of the optical filters may be performed according to two methods, which will be described below with reference to FIGS. 30 and 31.

3.5.1. Case in Which Desired Beam and Interference Beam Are Identified by Photodiodes Referring to FIG. 30, it may be seen that a desired beam and an interference beam are well aligned with the optical filter, so that the intensities of optical sources are well identified by photodiodes.

In this case, the receiving UE may perform data detection and decoding by performing O-to-E conversion of the intensities of photodiodes within a desired beam zone in the photodiode array. The receiving UE may perform no O-to-E conversion of the intensities of photodiodes within an interference beam zone in the photodiode array. In addition, the receiving UE may perform no O-to-E conversion of the intensities of photodiodes out of the desired beam zone and interference beam zone in the photodiode array.

3.5.1. Case in Which Desired Beam and Interference Beam Are Not Identified by Photodiode Array Referring to FIG. 31, it may be seen that a desired beam and an interference beam are not well aligned with the optical filter, so that the intensities of optical sources overlap in the photodiode array. For example, the intensities of optical sources may be concentrated at an undesired point due to interference sources in the following cases: i) if an interference beam is tilted although the transmitting UE and receiving UE are well aligned; or ii) if the interference source and the receiving UE are not aligned.

In this case, the receiving UE may perform data detection and decoding by performing O-to-E conversion of the intensities of photodiodes within a desired beam zone in the photodiode array.

The receiving UE may perform no O-to-E conversion of the intensities of photodiodes within an interference beam zone in the photodiode array. The receiving UE may perform no O-to-E conversion of the intensities of photodiodes within an area in the photodiode array where the desired beam and interference beam coexist (for example, the desired with interference beam zone in FIG. 31). In addition, the receiving UE may perform no O-to-E conversion of the intensities of photodiodes out of the desired beam zone and interference beam zone in the photodiode array.

3.6. Interference Measurement Method for Interference Cancellation

For the interference cancellation based on the above-described characteristics of the optical filters, interference measurement may be performed as follows.

3.6.1. Measurement Based on Reference Signal

According to an example or implementation of the present disclosure, the transmitting UE may periodically transmit a reference signal in a manner agreed upon with the receiving UE when transmitting the desired beam. According to an example or implementation of the present disclosure, in this case, the receiving UE may measure the channel state of the desired beam zone based on the reference signal.

Specifically, the receiving UE may determine photodiodes within a threshold with respect to the average intensity among photodiodes in the desired beam zone as desired photodiodes. This may be defined as shown in [Equation 2] below.

$$\frac{\left(\sum_{p}^{|D|} Intensity_p\right)}{|D|} - threshold_I <$$

$$desired\ photodiode < \frac{\left(\sum_{p}^{|D|} Intensity_p\right)}{|D|} + threshold_I,$$

where $p \in D$.

[Equation 2]

In [Equation 2], D denotes a set of photodiodes in the desired beam zone, IDI denotes the number of photodiodes in the desired beam zone, and $threshold_1$ denotes a predetermined or adaptively configured intensity threshold.

On the other hand, the receiving UE may determine photodiodes more than or less than the threshold with respect to the average intensity among the photodiodes in the desired beam zone as photodiodes in the interference beam zone. This may be defined as shown in [Equation 3] below.

$$\frac{\left(\sum_{p}^{|D|} Intensity_p\right)}{|D|} - threshold_I > Interference\ Photodiode.\ or$$

$$Interference\ Photodiode > \frac{\left(\sum_{p}^{|D|} Intensity_p\right)}{|D|} + threshold_J,$$

where $p \in D$

[Equation 3]

3.6.2. Interference Estimation on Assumption of Alignment between Transmitting UE and Receiving UE The receiving UE may assume that the desired beam zone is always created in the same area by the configurations of the optical filter and photodiode array. In other words, the receiving UE may assume that all areas except for the photodiodes in the desired beam zone correspond to the interference beam zone and may not use the areas for data detection and decoding.

Figure 32:
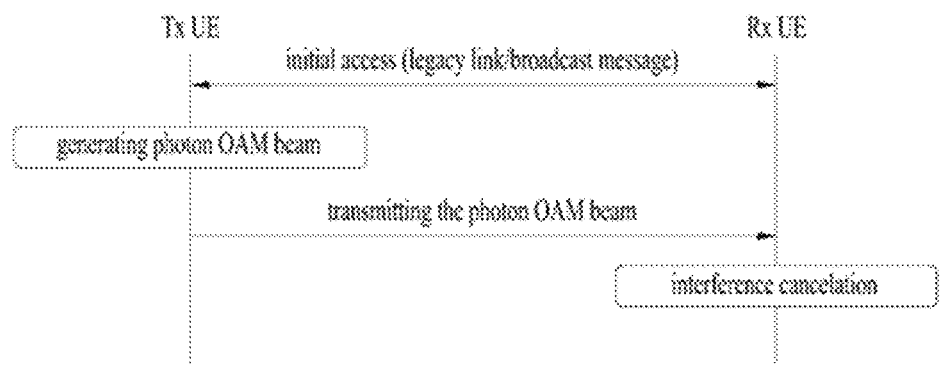
FIG. 32 is a diagram for explaining signal transmission and reception between a transmitting UE and a receiving UE in an optical wireless communication system according to an example or implementation of the present disclosure.

FIG. 32 is a diagram for explaining signal transmission and reception between a transmitting UE and a receiving UE in an optical wireless communication system according to an example or implementation of the present disclosure.

A method of receiving a signal by a receiving UE in optical wireless communication may include: establishing a communication link with a transmitting UE to perform the wireless optical communication; receiving optical signals from the transmitting UE through the communication link; and performing interference cancellation on the optical signals. In this case, establishing the communication link may include exchanging initial information with the transmitting UE, and the initial information may include an OAM mode applied to the optical signals. In addition, the interference cancellation may be performed based on the OAM mode.

Performing the interference cancellation may include selectively applying O-to-E conversion to the optical signals after passing the optical signals through an optical filter and detecting the optical signals with an optical-electrical converter.

The optical-electrical converter may include a plurality of optical-electrical conversion elements, and the O-to-E conversion may be applied to only an optical signal detected by an optical-electrical conversion element in which the intensities of the optical signals satisfy a predetermined threshold among the plurality of optical-electrical conversion elements.

The distance between the optical filter and the optical-electric converter may be configured to be a focal plane of the OAM mode applied to the optical signals based on the initial information. In addition, the O-to-E conversion may be applied to only an optical signal detected by an optical-electrical conversion element having distributed therein the intensities of the optical signals to which the OAM mode is applied among the plurality of optical-electrical conversion elements.

The optical filter may include at least one of a lens, a Fresnel zone plate, a photon sieve, or a phase mask.

The O-to-E conversion may not be applied to an optical signal detected by an optical-electrical conversion element in an area in which a desired signal and an interference signal among the optical signals detected by the optical-electrical converter overlap with each other.

Performing the interference cancellation may further include: receiving a reference signal from the transmitting UE; and performing channel estimation based on the reference signal in an area on the optical-electrical converter in which a desired signal is detected.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

MODE FOR DISCLOSURE

Various embodiments of the disclosure have been described in the best mode for carrying out the disclosure.

The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is industrially applicable to various wireless communication systems such as 3GPP LTE/LTE-A and 5G systems.

The invention claimed is:

1. A method of receiving a signal by a receiving user equipment (UE) for optical wireless communication, the method comprising:
   establishing a communication link with a transmitting UE to perform the wireless optical communication;
   receiving optical signals from the transmitting UE through the communication link; and
   performing interference cancellation on the optical signals,
   wherein establishing the communication link comprises exchanging initial information with the transmitting UE,
   wherein the initial information includes an orbital angular momentum (OAM) mode applied to the optical signals,
   wherein the interference cancellation is performed based on the OAM mode, and
   wherein performing the interference cancellation comprises selectively applying optical-to-electrical (O-to-E) conversion to the optical signals after passing the optical signals through an optical filter and detecting the optical signals with an optical-electrical converter.

2. The method of claim 1, wherein the optical-electrical converter comprises a plurality of optical-electrical conversion elements, and
   wherein the O-to-E conversion is applied to only an optical signal detected by an optical-electrical conversion element in which intensities of the optical signals satisfy a predetermined threshold among the plurality of optical-electrical conversion elements.

3. The method of claim 1, wherein a distance between the optical filter and the optical-electric converter is configured to be a focal plane of the OAM mode applied to the optical signals based on the initial information, and wherein the O-to-E conversion is applied to only an optical signal detected by an optical-electrical conversion element having distributed therein intensities of the optical signals to which the OAM mode is applied among the plurality of optical-electrical conversion elements included in the optical-electrical converter.

4. The method of claim 1, wherein the optical filter comprises at least one of a lens, a Fresnel zone plate, a photon sieve, or a phase mask.

5. The method of claim 1, wherein the O-to-E conversion is skipped for an optical signal detected by an optical-electrical conversion element in an area in which, among the optical signals detected by the optical-electrical converter, a desired signal and an interference signal overlap.

6. The method of claim 1, wherein performing the interference cancellation further comprises:

receiving a reference signal from the transmitting UE; and performing channel estimation based on the reference signal in an area on the optical-electrical converter in which a desired signal is detected.

7. A receiving user equipment (UE) configured to receive a signal for optical wireless communication, the receiving UE comprising:

a transceiver;

an optical filter;

an optical-electrical converter; and a processor configured to control the transceiver to establish a communication link with a transmitting UE, receive optical signals from the transmitting UE through the communication link, and perform interference cancellation on the optical signals, wherein the processor is configured to:

exchange initial information including an orbital angular momentum (OAM) mode applied to the optical signals with the transmitting UE to establish the communication link;

perform the interference cancellation based on the OAM mode, and selectively apply optical-to-electrical (O-to-E) conversion to the optical signals after passing the optical signals through the optical filter and detecting the optical signals with the optical-electrical converter.

8. The receiving UE of claim 7, wherein the processor is configured to apply the O-to-E conversion to only an optical signal detected by an optical-electrical conversion element in which intensities of the optical signals satisfy a predetermined threshold among a plurality of optical-electrical conversion elements.

9. The receiving UE of claim 7, wherein the processor is configured to:

set a distance between the optical filter and the optical-electric converter to be a focal plane of the OAM mode applied to the optical signals apply the O-to-E conversion to only an optical signal detected by an optical-electrical conversion element having distributed therein intensities of the optical signals to which the OAM mode is applied among the plurality of optical-electrical conversion elements included in the optical-electrical converter.

10. The receiving UE of claim 7, wherein the optical filter comprises at least one of a lens, a Fresnel zone plate, a photon sieve, or a phase mask.

11. The receiving UE of claim 7, wherein the processor is configured to skip the O-to-E conversion for an optical signal detected by an optical-electrical conversion element in an area in which, among the optical signals detected by the optical-electrical converter, a desired signal and an interference signal overlap.

12. The receiving UE of claim 7, wherein the processor is configured to:

control the transceiver to receive a reference signal from the transmitting UE; and perform channel estimation based on the reference signal in an area on the optical-electrical converter in which a desired signal is detected.

* * * * *